(12) United States Patent
Kim et al.

(10) Patent No.: US 11,332,553 B2
(45) Date of Patent: May 17, 2022

(54) CATALYST COMPOSITION FOR POLYMERIZING POLYOLEFIN, METHOD FOR PRODUCING POLYOLEFIN, AND POLYOLEFIN RESIN

(71) Applicant: DL CHEMICAL CO., LTD., Seoul (KR)

(72) Inventors: Da Jung Kim, Daejeon (KR); Byung Keel Sohn, Daejeon (KR); Jang Woo Lee, Daejeon (KR); Su Hyun Park, Busan (KR); Sung Ho Choi, Sejongsi (KR); Hee Jun Lee, Sejongsi (KR)

(73) Assignee: DL CHEMICAL CO., LTD., Seoul (KR)

( * ) Notice: Subject to any disclaimer, the term of this patent is extended or adjusted under 35 U.S.C. 154(b) by 79 days.

(21) Appl. No.: 16/682,657

(22) Filed: Nov. 13, 2019

(65) Prior Publication Data

US 2020/0231717 A1 Jul. 23, 2020

(30) Foreign Application Priority Data

Jan. 18, 2019 (KR) .................. 10-2019-0006816

(51) Int. Cl.
*C08F 210/16* (2006.01)
*C08F 4/659* (2006.01)
(Continued)

(52) U.S. Cl.
CPC ........ *C08F 4/65925* (2013.01); *C08F 4/6428* (2013.01); *C08F 4/65912* (2013.01);
(Continued)

(58) Field of Classification Search
CPC .................. C08F 210/16; C08F 2500/05; C08F 2500/37; C08F 4/65925; C08F 4/65916;
(Continued)

(56) References Cited

U.S. PATENT DOCUMENTS 4,461,873 A 7/1984 Bailey et al.
4,530,914 A 7/1985 Ewen et al.
(Continued)

FOREIGN PATENT DOCUMENTS

EP 2832753 A1 2/2015
EP 3428201 A1 1/2019
(Continued)

OTHER PUBLICATIONS

Examination report dated Oct. 9, 2020 for Indian application No. 201924039797.
(Continued)

*Primary Examiner* — Rip A Lee
(74) *Attorney, Agent, or Firm* — Nath, Goldberg & Meyer; Joshua B. Goldberg; Tanya E. Harkins

(57) ABSTRACT

A catalyst composition for polymerizing a polyolefin having excellent processability and impact strength, a process for producing a polyolefin and a polyolefin resin thereof are disclosed. The catalyst composition comprises at least one first organometallic compound of following formula 1; at least one second organometallic compound of following formula 2; and aluminoxane. The polyolefin resin satisfies following properties (i) to (iv) and (vi), (i) melt flow index (ASTM D1238), measured at 190° C., under a load of 2.16 kg: 0.1 to 1.5 g/10 min, (ii) density: 910 to 930 kg/m³, (iii) the ratio (Mw/Mn), as measured by gel permeation chromatography (GPC): 3.0 to 7.0, (iv) the ratio (Mz/Mw), as measured by GPC: 2.2 to 4.5, and (vi) when the TREF curve of multimodal distribution is deconvoluted, the area of TREF curve having a peak at 50 to 74° C. is 40 to 75% of the total area of the TREF curve.

5 Claims, 5 Drawing Sheets

(51) Int. Cl.
  *C08F 4/76* (2006.01)
  *C08F 4/6592* (2006.01)
  *C08F 4/642* (2006.01)
  *C08F 10/02* (2006.01)
  *C08F 10/06* (2006.01)
  *C08F 10/08* (2006.01)
  *C08F 10/14* (2006.01)

(52) U.S. Cl.
  CPC .......... *C08F 4/65916* (2013.01); *C08F 10/02* (2013.01); *C08F 10/06* (2013.01); *C08F 10/08* (2013.01); *C08F 10/14* (2013.01); *C08F 2420/01* (2013.01); *C08F 2500/05* (2013.01); *C08F 2500/37* (2021.01)

(58) Field of Classification Search
  CPC . C08F 4/6428; C08L 23/0815; C08L 2205/02
  See application file for complete search history.

(56) References Cited

U.S. PATENT DOCUMENTS

| | | | |
|---|---|---|---|
| 4,935,474 A | 6/1990 | Ewen et al. | |
| 5,840,645 A | 11/1998 | Ohno et al. | |
| 6,136,930 A * | 10/2000 | Bamberger | C08F 10/00 526/129 |
| 6,410,659 B1 | 6/2002 | Maddox et al. | |
| 6,828,394 B2 | 12/2004 | Vaughan et al. | |
| 7,141,632 B2 | 11/2006 | Vaughan et al. | |
| 7,989,564 B2 | 8/2011 | Loveday et al. | |
| 8,637,691 B2 | 1/2014 | Yang et al. | |
| 9,068,033 B2 * | 6/2015 | Fiscus | C08L 23/0815 |
| 9,181,372 B2 | 11/2015 | Yang et al. | |
| 9,403,920 B2 | 8/2016 | Willocq et al. | |
| 9,783,664 B1 * | 10/2017 | Wang | B29C 43/021 |
| 9,815,925 B2 * | 11/2017 | Lam | C08J 5/18 |
| 10,344,111 B2 * | 7/2019 | Morrison | C08J 5/18 |
| 10,538,654 B2 * | 1/2020 | Wang | C08J 5/18 |
| 2005/0215716 A1 | 9/2005 | Szul et al. | |
| 2008/0214753 A1 | 9/2008 | Loveday et al. | |
| 2018/0105625 A1 | 4/2018 | Rix et al. | |
| 2018/0155473 A1 | 6/2018 | Kuhlman | |
| 2018/0155474 A1 | 6/2018 | Holtcamp et al. | |

FOREIGN PATENT DOCUMENTS

| | | |
|---|---|---|
| EP | 3778668 A1 | 2/2021 |
| JP | 4020862 B2 | 12/2007 |
| KR | 1020040053098 A | 6/2004 |
| KR | 1020050046270 A | 5/2005 |
| KR | 100577139 B1 | 5/2006 |
| KR | 101397077 B1 | 5/2013 |
| KR | 1020150099543 A | 8/2015 |
| KR | 1020160119801 A | 10/2016 |
| RU | 2433143 C2 | 3/2010 |
| RU | 2462479 C2 | 10/2011 |
| WO | 99/32531 A1 | 7/1999 |
| WO | 2014100889 A1 | 7/2014 |
| WO | 2020046406 A1 | 3/2020 |

OTHER PUBLICATIONS

Partial European Search Report completed on Jun. 17, 2020 for application No. EP19210951.
European Search Report completed on Nov. 26, 2020 for application No. EP19210951.
Search Report dated Apr. 9, 2020 issued in corresponding Russian Application No. 2019139095/04(076907).
C. Zuccaccia, L. Tensi, R.L. Kuhlman, A.P.G> Jr., A. Macchioni, ACS Catalysis, 2017, 7, 563-567.

* cited by examiner

CATALYST COMPOSITION FOR POLYMERIZING POLYOLEFIN, METHOD FOR PRODUCING POLYOLEFIN, AND POLYOLEFIN RESIN

CROSS-REFERENCE TO RELATED APPLICATION

This application claims benefit of priority to Korean Patent Application No. 10-2019-0006816 filed on Jan. 18, 2019, the entire content of which is incorporated herein by reference.

TECHNICAL FIELD

This invention relates to a polyolefin resin, and more particularly, to a catalyst composition for polymerizing polyolefin with excellent processability and impact strength, a method for producing such polyolefin, and a polyolefin resin produced by the same.

BACKGROUND ART

LLDPE (Linear Low-Density Polyethylene) is produced by copolymerizing ethylene and alpha-olefin (commercially, 1-butene, 1-hexene and 1-octene are mainly used) using a polymerization catalyst at low pressure, and it has a low molecular weight distribution and few LCB (Long-Chain Branch). Also, it has good physical properties of breaking strength, strain %, tear strength, dart falling impact strength and so on at a density level similar to LDPE (Low-Density Polyethylene) produced by a conventional high-pressure method. Therefore, LLDPE (Linear Low-Density Polyethylene) is being used increasingly in the fields to which conventional LDPE or HDPE (High-Density Polyethylene) the application is difficult, such as a stretch film and an overlap film. In such applications, the film should have excellent processability and breaking strength, tear strength, dart falling impact strength and haze, among them, dart falling impact strength and processability are one of the important physical properties required in the recent high strength film field.

ZN(Ziegler-Natta)-LLDPE produced by using a conventional ZN (Ziegler-Natta) catalysts has broad molecular weight distribution so that its processability is excellent but its physical properties are lowered. On the other hand, the mLLDPE (metallocene Linear Low-Density Polyethylene) prepared by using a metallocene catalyst with a single active site has excellent physical properties, but it has a disadvantage of low processability due to a narrow molecular weight distribution. Therefore, many studies have been conducted to produce polyolefins having a broad molecular weight distribution or a multimodal molecular weight distribution. One method among them is a post-reactor process or a melting blending process in which polyolefins having at least two different molecular weights are blended before or during the processing of the polyolefin. For example, U.S. Pat. No. 4,461,873 discloses a method of physically bending two different kinds of polymers for preparing a bimodal polymer blend. When such a physical blending method is used, it is liable to produce a molded form having high gel component, a product appearance is deteriorated owing to the gel component, and thus the polyolefin cannot be used for the films. Further, the physical blending method requires a complete uniformity, so there is a disadvantage of the preparing cost being increased.

Another method for preparing polyolefin having broad molecular weight distribution or multimodal molecular weight distribution is to use a multistage reactor. In the multistage reactor which includes two or more reactors, a first polymer component having one molecular weight distribution among two different molecular weight distribution of the polymer, is prepared in a certain condition at a first reactor, the first polymer component prepared is transferred to a second reactor, and then a second polymer component having different molecular weight distribution from that of the first polymer component, is prepared in a different condition from that of the first reactor, at the second reactor. The above-mentioned method solves the problems relating to the gel component, but it uses the multistage reactor, so the production efficiency may be lowered, or the production cost may be increased.

Still another method for preparing polyolefin having broad molecular weight distribution or multimodal molecular weight distribution is to polymerize the polyolefin by using a mixture of catalysts in a single reactor. Recently, in the pertinent art, the various attempts have been made for producing polyolefin having broad molecular weight distribution or multimodal molecular weight distribution, by using two or more different catalysts in a single reactor. In this method, the resin particles are uniformly mixed in a level of sub-particles, thus the resin components each having different molecular weight distribution exists in a single phase. For example, U.S. Pat. Nos. 4,530,914 and 4,935,474 disclose a method for producing a polyolefin having a broad molecular weight distribution by polymerizing ethylene or alpha-olefins in the presence of a catalyst system comprising two or more metallocenes and aluminoxanes having different reaction development and termination rate constants.

In order to improve physical properties while having a broad molecular weight distribution, research on the concept of a polymer structure, BOCD (Broad Orthogonal Composition Distribution) in which co-monomers such as alpha-olefins are incorporated predominantly in the high molecular weight chains, has been actively conducted. When the BOCD characteristic is present, the relatively many alpha-olefin comonomer is distributed to the high molecular weight ethylene chain, so that the mechanical properties such as breaking strength, tear strength, and dart falling impact strength are improved. The following are known for realizing such BOCD characteristic: (i) use of special catalytic species capable of expressing the BOCD structure BOCD; or (ii) use of two or more catalytic species in which a first catalyst species forms a polymer having a low comonomer reactivity and a relatively low molecular weight and a second catalyst species form a polymer having a high comonomer reactivity and a relatively high molecular weight; or (iii) a method of operating a cascade reactor using two or more reactors, wherein a first polymer component having a relatively low comonomer content and a low molecular weight is produced in one reactor, and a second polymer component having a relatively high comonomer content and a high molecular weight produced in another reactor, and so on. Among them, the catalytic system employing a plurality of catalytic species or the cascade operation of the reactor, can broaden the molecular weight distribution as well as expression of BOCD characteristics to improve both mechanical properties and processability.

Hafnium-based metallocene catalysts are known to express the BOCD structure (C. Zuccaccia, L. Tensi, R. L. Kuhlman, A. P. G. Jr., A. Macchioni, ACS Catalysis, 2017, 7, 563-567). The use of multiple catalyst species or cascade operation is essential when making BOCD structures using catalyst species that do not exhibit the BOCD structure. When two or more catalyst species are used, the first catalyst species can form a low molecular weight main chain having a low comonomer content and the second catalyst species can form a high molecular weight main chain having a high comonomer content, respectively. When cascade operation is performed in a polymerization process in which two or more reactors are connected in series, a high molecular weight main chain with a low comonomer content can be made in a first reactor and a high molecular weight main chain with a high comonomer content can be made in a second reactor, or a high molecular weight main chain with a high comonomer content can be produced in the first reactor and a low molecular weight main chain with a low monomer content can be made in the second reactor.

U.S. Pat. No. 6,410,659 discloses a method for producing a low molecular weight main chain using a metallocene catalyst with low comonomer reactivity as the first catalyst species and for producing a high molecular weight main chain using a Ziegler-Natta catalyst as the second catalyst. U.S. Pat. No. 7,989,564 discloses a method for realizing BOCD structure by using a catalyst system having a hafnium-based metallocene catalyst as the first catalyst and a zirconium-based metallocene catalyst as the second catalyst. U.S. Pat. No. 9,181,372 discloses a method for realizing BOCD structure by using a catalyst system having total three metallocene catalyst species (hafnium catalyst and zirconium system are mixed). Korean Patent No. 1,397,077 discloses a polyethylene for a film having excellent dart falling impact strength and transparency using a hybrid supported metallocene catalyst in which at least two different metallocene compounds are supported, and a method for producing the same. Catalyst components for controlling the incorporation of the comonomer are disclosed in U.S. Pat. No. 6,828,394 B2, U.S. Pat. No. 7,141,632 B2, Korean Patent No. 10-0577139 B1, and Japanese Patent No. 4020862 B2.

Under these circumstances, in order to satisfy various specifications required by application fields or customers, there is a need to develop polyethylene having both the properties at a level of a single metallocene polyethylene and the processability at a level of the Ziegler-Natta polyethylene, by using two or more different transition metal compounds.

DISCLOSURE

Technical Problem

An object of the present invention is to provide a catalyst composition for polymerizing polyolefin with excellent processability and impact strength, a method for producing such polyolefin, and a polyolefin resin produced by the same.

Another object of the present invention is to provide a catalyst composition for polymerizing polyolefin useful for molding high strength film such as stretch films, overlap films, etc., a method for producing such polyolefin, and a polyolefin resin produced by the same.

Still another object of the present invention is to provide a catalyst composition for polymerizing polyolefin in which it is possible to control the molecular weight distribution and the chemical composition distribution, a method for producing such polyolefin, and a polyolefin resin produced by the same.

Technical Solution

To achieve the objects of the present invention according to one aspect, there is provided a catalyst composition for polymerizing polyolefin, the catalyst composition comprising at least one first organometallic compound represented by the following formula 1; at least one second organometallic compound represented by the following formula 2; and aluminoxane.

$$(L1)(L2)(X1)(X2)M1 \quad \text{[Formula 1]}$$

In Formula 1, M1 is hafnium (Hf); (L1) and (L2) each is a cyclopentadienyl group having an alkyl substituent of 3 to 4 carbon atoms; (X1) and (X2) each is independently F, Cl, Br, I or a hydrocarbon group of 1 to 10 carbon atoms.

[Formula 2]

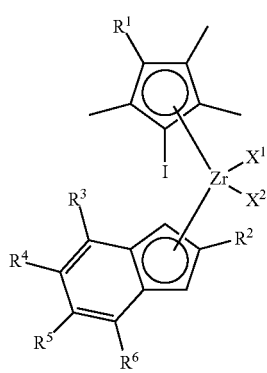

In Formula 2, $R^1$ to $R^6$ each is independently hydrogen, halogen or a hydrocarbon group of 1 to 10 carbon atoms; $X^1$ and $X^2$ each is independently F, Cl, Br, I or a hydrocarbon group of 1 to 10 carbon atoms.

The catalyst composition for polymerizing polyolefin further comprises a phenol compound represented by the following formula 6.

[Formula 6]

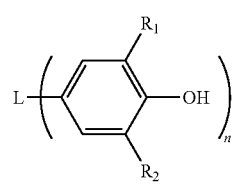

In Formula 6, $R_1$, $R_2$ and L each is independently a hydrogen or Alkyl group, alkoxy group, aryl group, aryloxy group, alkenyl group, arylalkyl group, alkylaryl group, arylalkenyl group, cycloalkyl group, cycloalkylalkenyl group, heteroaryl group, heterocycloalkyl group of 1 to 10 carbon atoms, an alkyl group of 1 to 5 carbon atoms in which an alkyl group of 1 to 20 carbon atoms is bonded via —S—, —PO$_3$=, —CON—, —COO— and/or —O— or a substituted or unsubstituted heteroarylamine group, and n is an integer of 1 to 4.

The present invention provides a polyolefin resin satisfying the following properties (i) to (v).

(i) The melt flow index (measured according to ASTM D1238), measured at 190° C., under a load of 2.16 kg: 0.1 to 1.5 g/10 min (ii) Density: 910 to 930 kg/m³

(iii) The ratio (Mw/Mn) of the weight average molecular weight (Mw) to the number average molecular weight (Mn), as measured by gel permeation chromatography: 3.0 to 7.0

(iv) The ratio (Mz/Mw) of the Z-average molecular weight (Mz) to the weight-average molecular weight (Mw), as measured by gel permeation chromatography: 2.2 to 4.5

(v) In TREF (Temperature Rising Elution Fractionation) of multimodal distribution, the weight percentage (wt %) sum (A) and the density (D, unit: kg/m³) of components eluted at a temperature range of 43 to 71° C. (A) satisfies the following Equation 1.

$$A > -2.5*(D) + 2325 \quad \text{[Equation 1]}$$

The present invention provides a polyolefin resin which is polymerized by the polyolefin polymerization catalyst composition and satisfies the above properties of (i) to (iv) and the following property of (vi).

(vi) When the TREF curve of multimodal distribution is deconvoluted, the area of the TREF curve having a peak at 50 to 74° C. is 40 to 75% of the total area of the TREF curve of multimodal distribution.

Also, the present invention provides a polyolefin resin which is polymerized by the polyolefin polymerization catalyst composition and satisfies the above properties of (i) to (iv) and the following properties of (vii) and (viii).

(vii) COI (Comonomer Orthogonal Index) value calculated by the following Equation 2: 4.5 to 18

$$\text{comonomer orthogonal index } (COI) = \frac{SCB \text{ number in } Mz - SCB \text{ number in } Mn}{\log Mz - \log Mn} \quad \text{[Equation 2]}$$

In Equation 2, Mz and Mn are the Z-average molecular weight and the number average molecular weight of the polyolefin resin, measured by gel permeation chromatography equipped with an IR detector, respectively, and the number of SCB (Short Chain Branch) s in Mz and the number of SCBs in Mn represent the number of average side branches derived from comonomers per 1000 carbons in Z-average molecular weight (Mz) and number-average molecular weight (Mn), respectively.

(viii) The average SCBs number per 1,000 carbons (B), and the density (D, unit: kg/m³) over the entire molecular weight range satisfy the following Equation 3.

$$B > -0.6*(D) + 563 \quad \text{[Equation 3]}$$

Technical Effects

The polyolefin resin according to the present invention is excellent in processability and impact strength and is particularly useful for producing high-strength films such as stretch films and overlap films. Further, the polyolefin polymerization catalyst composition and the method s for producing a polyolefin according to the present invention have an advantage in that the molecular weight distribution and the chemical composition distribution can be controlled in the polymerization of the polyolefin resin.

DETAILED DESCRIPTION OF INVENTION

Figure 1:
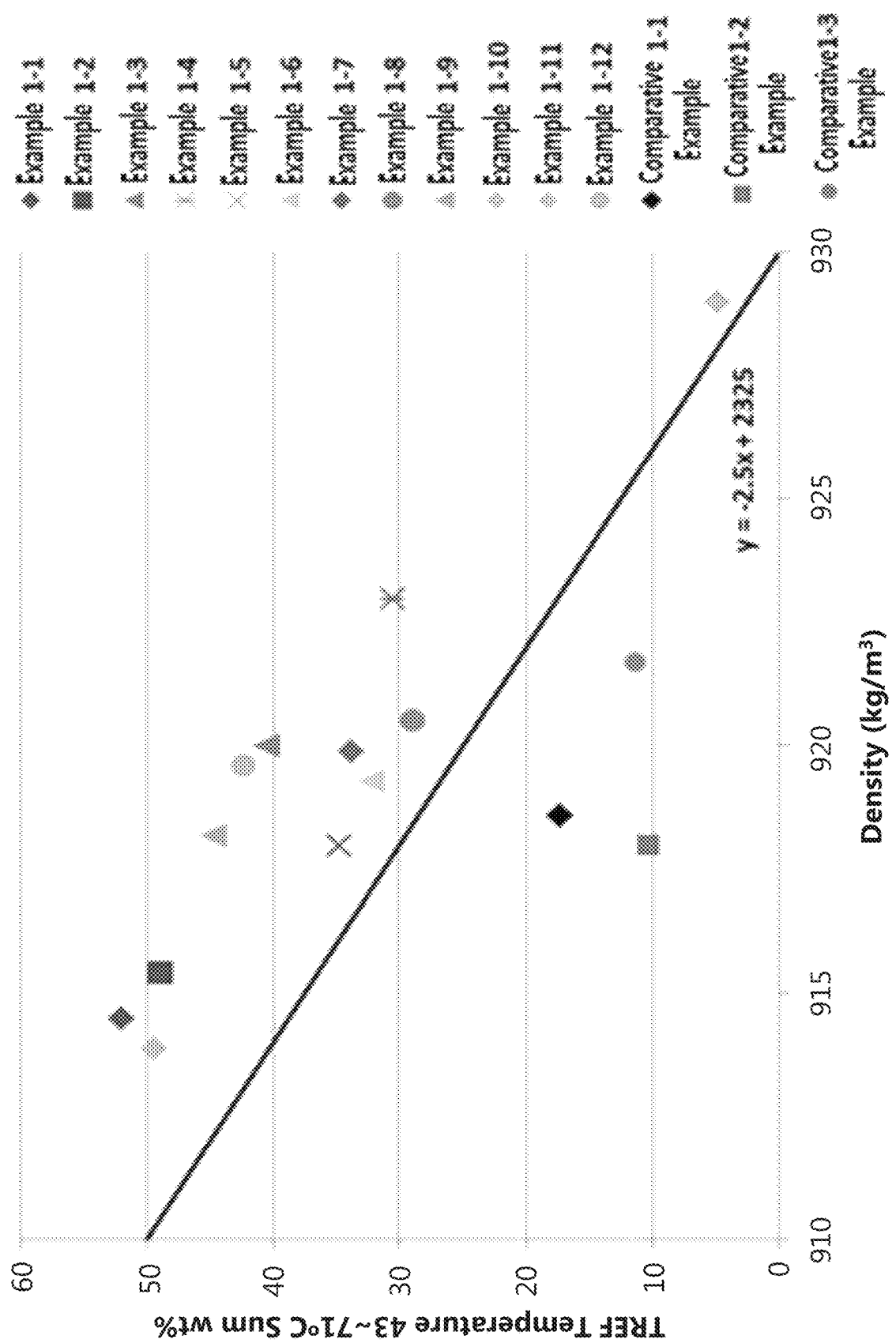
FIG. 1 is a graph showing sum (A) of the weight percentage of components eluted at a temperature range of 43 to 71° C. in the TREF (Temperature Rising Elution Fractionation) of multimodal distribution according to the density (D) of the polyolefin resins obtained in Examples and Comparative Examples in the present invention.

In the present specification, the terms 'first', 'second' etc. are used to describe various components and used only for the purpose of distinguishing one component from another. The terminology used herein is for the purpose of describing exemplary embodiments only and is not intended to limit the invention. The singular forms include plural referents unless the context clearly dictates otherwise. In the present specification, the terms 'including', 'comprising' or 'having' are intended to indicate that there may exist any features, numbers, steps, elements, or a combination thereof and it should be understood that they does not preclude the presence or addition of one or more other features, numbers, steps, components or combinations thereof. While the invention is susceptible to various modifications and alternative forms, specific embodiments thereof are shown by way of example in the drawings and will herein be described in detail. It should be understood, however, that the invention is not intended to be limited to the particular forms disclosed, but includes all modifications, equivalents, and alternatives falling within the spirit and scope of the invention.

Hereinafter, the present invention will be described in more detail. The polyolefin polymerization catalyst composition according to the present invention comprises two or more different organometallic compounds including a first organometallic compound and a second organometallic compound, and aluminoxane, and may further include a porous carrier if necessary.

As the first organometallic compound, various metallocene catalyst components commonly used in ethylene polymerization can be used without any particular limitation, but it is preferable to use at least one organometallic compound represented by the following Formula 1. The first organometallic compound has a relatively higher molecular weight than the second organometallic compound described later and has a function of forming a polymer having a high comonomer content. The lower the density of the high molecular weight polyolefin which is polymerized by the first organometallic compound is, that is, the higher the comonomer content is, the greater the impact strength of the molded article formed by the polyolefin resin is, due to the tie Molecules between the SCBs.

$$(L1)(L2)(X1)(X2)M1 \quad \text{[Formula 1]}$$

In Formula 1, M1 is hafnium (Hf); (L1) and (L2) each is independently a cyclopentadienyl group having an alkyl substituent of 3 to 4 carbon atoms; (X1) and (X2) each is independently F, Cl, Br, I or a hydrocarbon group of 1 to 10 carbon atoms.

The non-limiting examples of the first organometallic compound include bis(normal-propylcyclopentadienyl) hafnium difluoride, bis(normal-propylcyclopentadienyl)hafnium dichloride, bis(normal-propylcyclopentadienyl) hafnium dibromide, bis(normal-propylcyclopentadienyl) hafnium diiodide, bis(normal-butylcyclopentadienyl) hafnium difluoride, bis(normal-butylcyclopentadienyl) hafnium dichloride, bis(normal-butylcyclopentadienyl) hafnium dibromide, bis(normal-butylcyclopentadienyl) hafnium diiodide, bis(iso-butylcyclopentadienyl)hafnium difluoride, bis(iso-butylcyclopentadienyl)hafnium dichloride, bis(iso-butylcyclopentadienyl)hafnium dibromide, bis(iso-butylcyclopentadienyl)hafnium diiodide, bis(iso-propylcyclopentadienyl)hafnium difluoride, bis(iso-propylcyclopentadienyl)hafnium dichloride, bis(iso-propylcyclopentadienyl)hafnium dibromide, bis(iso-propylcyclopentadienyl)hafnium diiodide and so on.

As the second organometallic compound, it is preferable to use at least one organometallic compound represented by the following Formula 2. The second organometallic compound has a relatively lower molecular weight than the first organometallic compound and has a function of forming a polymer having a low comonomer content. The higher the density of the low molecular weight polyolefin which is polymerized by the second organometallic compound is, that is, the lower the comonomer content is, the greater the impact strength of the molded article formed by the polyolefin resin is. The second organometallic compound can control the activity and the molecular weight of the polymer according to the substituent bonded to the cyclopentadienyl group. Specifically, the second organometallic compound includes a cyclopentadienyl ligand and an indenyl group having four or more substituents as a ligand exhibiting a steric hindrance effect. Upon contact of the comonomer, steric hindrance inhibits the comonomer from coordinating with the central metal, thereby increasing the density of the low molecular weight polymer.

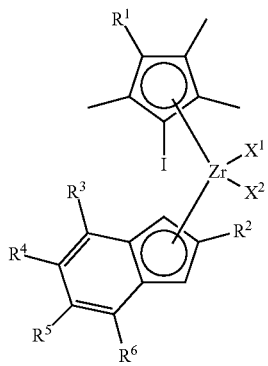

[Formula 2]

In Formula 2, $R^1$ to $R^6$ each is independently hydrogen, halogen or a hydrocarbon group of 1 to 10 carbon atoms; $X^1$ and $X^2$ each is independently F, Cl, Br, I or a hydrocarbon group of 1 to 10 carbon atoms. Specific examples of $R^1$ to $R^6$ are independently an alkyl group having 1 to 10 carbon atoms or a 5-membered to 7-membered cycloalkyl group, a cycloalkenyl group or an aryl group, and $R^3$ to $R^6$ are linked to other carbon atoms to form a ring.

The non-limiting examples of the second organometallic compound include (pentamethylcyclopentadienyl)(indenyl) zirconium dichloride, (pentamethylcyclopentadienyl)(2-methylindenyl) zirconium dichloride, (pentamethylcyclopentadienyl)(2-ethylindenyl) zirconium dichloride, (pentamethylcyclopentadienyl)(2-propylindenyl) zirconium dichloride, (pentamethylcyclopentadienyl)(2-isopropylindenyl)zirconium dichloride, (pentamethylcyclopentadienyl)(2-butylindenyl)zirconium dichloride, (pentamethylcyclopentadienyl)(2-isobutylindenyl)zirconium dichloride, (pentamethylcyclopentadienyl)(2-phenylindenyl)zirconium dichloride, (pentamethylcyclopentadienyl)(2-methyl-4-phenylindenyl)zirconium dichloride, (pentamethylcyclopentadienyl)(2-methylbenzo(e)indenyl)zirconium dichloride, (pentamethylcyclopentadienyl)(2,4,6-trimthylindenyl)zirconium dichloride, (pentamethyl cyclopentadienyl)(2,4,7-trimthylindenyl)zirconium dichloride, (pentamethylcyclopentadienyl)(4,7-dimethylIndenyl)zirconium dichloride, (pentamethylcyclopentadienyl)(fluorenyl)zirconium dichloride, (1,2,3,4-tetramethyl-5-propylcyclopentadienyl)(indenyl)zirconium dichloride, (1,2,3,4-tetramethyl-5-propylcyclopentadienyl)(2-methylindenyl)zirconium dichloride, (1,2,3,4-tetramethyl-5-propylcyclopentadienyl)(2-ethylindenyl)zirconium dichloride, (1,2,3,4-tetramethyl-5-propylcyclopentadienyl)(2-propylindenyl)zirconium dichloride, (1,2,3,4-tetramethyl-5-propylcyclopentadienyl)(2-isopropylindenyl)zirconium dichloride, (1,2,3,4-tetramethyl-5-propylcyclopentadienyl)(2-butylindenyl)zirconium dichloride, (1,2,3,4-tetramethyl-5-propylcyclopentadienyl)(2-isobutylindenyl)zirconium dichloride, (1,2,3,4-tetramethyl-5-propylcyclopentadienyl)(2-phenylindenyl)zirconium dichloride, (1,2,3,4-tetramethyl-5-propylcyclopentadienyl)(2-methyl-4-phenylindenyl)zirconium dichloride, (1,2,3,4-tetramethyl-5-propylcyclopentadienyl)(2-methylbenzo(e)indenyl)zirconium dichloride, (1,2,3,4-tetramethyl-5-propylcyclopentadienyl)(2,4,6-trimethylindenyl)zirconium dichloride, (1,2,3,4-tetramethyl-5-propylcyclopentadienyl)(2,4,7-trimethylindenyl)zirconium dichloride, (1,2,3,4-tetramethyl-5-propylcyclopentadienyl)(4,7-dimethylindenyl)zirconium dichloride, (1,2,3,4-tetramethyl-5-propylcyclopentadienyl)(fluorenyl) zirconium dichloride, (1-ethyl-2,3,4,5-tetramethylcyclopentadienyl)(indenyl) zirconium dichloride, (1-ethyl-2,3,4,5-tetramethylcyclopentadienyl)(2-methylindenyl) zirconium dichloride, (1-ethyl-2,3,4,5-tetramethylcyclopentadienyl)(2-ethylindenyl) zirconium dichloride, (1-ethyl-2,3,4,5-tetramethylcyclopentadienyl)(2-propylindenyl) zirconium dichloride, (1-ethyl-2,3,4,5-tetramethylcyclopentadienyl)(2-isopropylindenyl) zirconium dichloride, (1-ethyl-2,3,4,5-tetramethylcyclopentadienyl)(2-butylindenyl) zirconium dichloride, (1-ethyl-2,3,4,5-tetramethylcyclopentadienyl)(2-isobutylindenyl) zirconium dichloride, (1-ethyl-2,3,4,5-tetramethylcyclopentadienyl)(2-phenylindenyl)zirconium dichloride, (1-ethyl-2,3,4,5-tetramethylcyclopentadienyl)(2-methyl-4-phenylindenyl)zirconium dichloride, (1-ethyl-2,3,4,5-tetramethylcyclopentadienyl)(2-methylbenzoindenyl) zirconium dichloride, (1-ethyl-2,3,4,5-tetramethylcyclopentadienyl)(2,4,6-trimethylindenyl) zirconium dichloride, (1-ethyl-2,3,4,5-tetramethylcyclopentadienyl)(2,4,7-trimethylindenyl) zirconium dichloride, (1-ethyl-2,3,4,5-tetramethylcyclopentadienyl)(4,7-dimethylindenyl) zirconium dichloride, (1-ethyl-2,3,4,5-tetramethylcyclopentadienyl)(fluorenyl) zirconium dichloride, (pentamethylcyclopentadienyl)(indenyl)zirconium diiodide, (pentamethylcyclopentadienyl)(2-methylindenyl)zirconium diiodide, (pentamethylcyclopentadienyl)(2-ethylindenyl)zirconium diiodide, (pentamethylcyclopentadienyl)(2-propylindenyl) zirconium diiodide, (pentamethylcyclopentadienyl)(2-isopropylindenyl)zirconium diiodide, (pentamethylcyclopentadienyl)(2-butylindenyl)zirconium diiodide, (pentamethylcyclopentadienyl)(2-isobutylindenyl) zirconium diiodide, (pentamethylcyclopentadienyl)(2-phenylindenyl)zirconium diiodide, (pentamethylcyclopentadienyl)(2-methyl-4-phenylindenyl)zirconium diiodide, (pentamethylcyclopentadienyl)(2-methylbenzoindenyl)zirconium diiodide, (pentamethylcyclopentadienyl)(2,4,6-trimethylindenyl)zirconium diiodide, (pentamethylcyclopentadienyl)(2,4,7-trimethylindenyl)zirconium diiodide, (pentamethylcyclopentadienyl)(4,7-dimethylindenyl)zirconium diiodide, (pentamethylcyclopentadienyl)(fluorenyl) zirconium diiodide, (1,2,3,4-tetramethyl-5-propylcyclopentadienyl)(indenyl)zirconium diiodide, (1,2,3,4-tetramethyl-5-propylcyclopentadienyl)(2-methylindenyl) zirconium diiodide, (1,2,3,4-tetramethyl-5-propylcyclopentadienyl)(2-ethylindenyl) zirconium diiodide, (1,2,3,4-tetramethyl-5-propylcyclopentadienyl)(2-propylindenyl) zirconium diiodide, (1,2,3,4-tetramethyl-5-propylcyclopentadienyl)(2-isopropylindenyl) zirconium diiodide, (1,2,3,4-tetramethyl-5-propylcyclopentadienyl)(2-butylindenyl) zirconium diiodide, (1,2,3,4-tetramethyl-5-propylcyclopentadienyl)(2-isobutylindenyl) zirconium diiodide, (1,2,3,4-tetramethyl-5-propylcyclopentadienyl)(2-phenylindenyl) zirconium diiodide, (1,2,3,4-tetramethyl-5-propylcyclopentadienyl)(2-methyl-4-phenylindenyl) zirconium diiodide, (1,2,3,4-tetramethyl-5-propylcyclopentadienyl)(2-methylbenzoindenyl) zirconium diiodide, (1,2,3,4-tetramethyl-5-propylcyclopentadienyl)(2,4,6-trimethylindenyl)zirconium diiodide, (1,2,3,4-tetramethyl-5-propylcyclopentadienyl)(2,4,7-trimethylindenyl) zirconium diiodide, (1,2,3,4-tetramethyl-5-propylcyclopentadienyl)(4,7-dimethylindenyl) zirconium diiodide, (1,2,3,4-tetramethyl-5-propylcyclopentadienyl)(fluorenyl) zirconium diiodide, (1-ethyl-2,3,4,5-tetramethylcyclopentadienyl)(indenyl) zirconium diiodide, (1-ethyl-2,3,4,5-tetramethylcyclopentadienyl)(2-methylindenyl) zirconium diiodide, (1-ethyl-2,3,4,5-tetramethylcyclopentadienyl)(2-ethylindenyl) zirconium diiodide, (1-ethyl-2,3,4,5-tetramethylcyclopentadienyl)(2-propylindenyl) zirconium diiodide, 1-ethyl-2,3,4,5-tetramethylcyclopentadienyl)(2-isopropylindenyl) zirconium diiodide, (1-ethyl-2,3,4,5-tetramethylcyclopentadienyl)(2-butylindenyl) zirconium diiodide, (1-ethyl-2,3,4,5-tetramethylcyclopentadienyl)(2-isobutylindenyl) zirconium diiodide, (1-ethyl-2,3,4,5-tetramethylcyclopentadienyl)(2-phenylindenyl) zirconium diiodide, (1-ethyl-2,3,4,5-tetramethylcyclopentadienyl)(2-methyl-4-phenylindenyl) zirconium diiodide, (11-ethyl-2,3,4,5-tetramethylcyclopentadienyl)(2-methylbenzoindenyl) zirconium diiodide, (1-ethyl-2,3,4,5-tetramethylcyclopentadienyl)(2,4,6-trimethylindenyl) zirconium diiodide, 1-ethyl-2,3,4,5-tetramethylcyclopentadienyl)(2,4,7-trimethylindenyl) zirconium diiodide, (1-ethyl-2,3,4,5-tetramethylcyclopentadienyl)(4,7-dimethylindenyl) zirconium diiodide, (1-ethyl-2,3,4,5-tetramethylcyclopentadienyl)(fluorenyl) zirconium diiodide, (pentamethylcyclopentadienyl)(indenyl)zirconium dibromide, (pentamethylcyclopentadienyl)(2-methylindenyl) zirconium dibromide, (pentamethylcyclopentadienyl)(2-ethylindenyl) zirconium dibromide, (pentamethylcyclopentadienyl)(2-propylindenyl) zirconium dibromide, (pentamethylcyclopentadienyl)(2-isopropylindenyl) zirconium dibromide, (pentamethylcyclopentadienyl)(2-butylindenyl) zirconium dibromide, (pentamethylcyclopentadienyl)(2-isobutylindenyl) zirconium dibromide, (pentamethylcyclopentadienyl)(2-phenylindenyl) zirconium dibromide, (pentamethylcyclopentadienyl)(2-methyl-4phenylindenyl) zirconium dibromide, (pentamethylcyclopentadienyl)(2-methylbenzindenyl) zirconium dibromide, (pentamethylcyclopentadienyl)(2,4,6-trimethylindenyl) zirconium dibromide, (pentamethylcyclopentadienyl)(2,4,7-trimethylindenyl) zirconium dibromide, (pentamethylcyclopentadienyl)(4,7-dimethylindenyl) zirconium dibromide, (pentamethylcyclopentadienyl)(fluorenyl) zirconium dibromide, (1,2,3,4-tetramethyl-5-propylcyclopentadienyl)(indenyl) zirconium dibromide, (1,2,3,4-tetramethyl-5-propylcyclopentadienyl)(2-methylindenyl) zirconium dibromide, (1,2,3,4-tetramethyl-5-propylcyclopentadienyl)(2-ethylindenyl) zirconium dibromide, (1,2,3,4-tetramethyl-5-propylcyclopentadienyl)(2-propylindenyl) zirconium dibromide, (1,2,3,4-tetramethyl-5-propylcyclopentadienyl)(2-isopropylindenyl) zirconium dibromide, (1,2,3,4-tetramethyl-5-propylcyclopentadienyl)(2-butylindenyl) zirconium dibromide, (1,2,3,4-tetramethyl-5-propylcyclopentadienyl)(2-isobutylindenyl) zirconium dibromide, (1,2,3,4-tetramethyl-5-propylcyclopentadienyl)(2-phenylindenyl) zirconium dibromide, (1,2,3,4-tetramethyl-5-propylcyclopentadienyl)(2-methyl-4phenylindenyl) zirconium dibromide, (1,2,3,4-tetramethyl-5-propylcyclopentadienyl)(2-methylbenzindenyl) zirconium dibromide, (1,2,3,4-tetramethyl-5-propylcyclopentadienyl)(2,4,6-trimethylindenyl) zirconium dibromide, (1,2,3,4-tetramethyl-5-propylcyclopentadienyl)(2,4,7-trimethylindenyl) zirconium dibromide, (1,2,3,4-tetramethyl-5-propylcyclopentadienyl)(4,7-dimethylindenyl) zirconium dibromide, (1,2,3,4-tetramethyl-5-propylcyclopentadienyl)(fluorenyl) zirconium dibromide, (1-ethyl-2,3,4,5-tetramethylcyclopentadienyl)(indenyl) zirconium dibromide, (1-ethyl-2,3,4,5-tetramethylcyclopentadienyl)(2-methylindenyl) zirconium dibromide, (1-ethyl-2,3,4,5-tetramethylcyclopentadienyl)(2-ethylindenyl) zirconium dibromide, (1-ethyl-2,3,4,5-tetramethylcyclopentadienyl)(2-propylindenyl) zirconium dibromide, (1-ethyl-2,3,4,5-tetramethylcyclopentadienyl)(2-isopropylindenyl) zirconium dibromide, (1-ethyl-2,3,4,5-tetramethylcyclopentadienyl)(2-butylindenyl) zirconium dibromide, (1-ethyl-2,3,4,5-tetramethylcyclopentadienyl)(2-isobutylindenyl) zirconium dibromide, (1-ethyl-2,3,4,5-tetramethylcyclopentadienyl)(2-phenylindenyl) zirconium dibromide, (1-ethyl-2,3,4,5-tetramethylcyclopentadienyl)(2-methyl-4-phenylindenyl) zirconium dibromide, (1-ethyl-2,3,4,5-tetramethylcyclopentadienyl)(2-methylbenzindenyl) zirconium dibromide, (1-ethyl-2,3,4,5-tetramethylcyclopentadienyl)(2,4,6-trimethylindenyl) zirconium dibromide, (1-ethyl-2,3,4,5-tetramethylcyclopentadienyl)(2,4,7-trimethylindenyl) zirconium dibromide, (1-ethyl-2,3,4,5-tetramethylcyclopentadienyl)(4,7-dimethylindenyl) zirconium dibromide, (1-ethyl-2,3,4,5-tetramethylcyclopentadienyl)(fluorenyl) zirconium dibromide, (pentamethylcyclopentadienyl)(indenyl)zirconium difluoride, (pentamethylcyclopentadienyl)(2-methylindenyl) zirconium difluoride, (pentamethylcyclopentadienyl)(2-ethylindenyl) zirconium difluoride, (pentamethylcyclopentadienyl)(2-propylindenyl) zirconium difluoride, (pentamethylcyclopentadienyl)(2-isopropylindenyl) zirconium difluoride, (pentamethylcyclopentadienyl)(2-butylindenyl) zirconium difluoride, (pentamethylcyclopentadienyl)(2-isobutylindenyl) zirconium difluoride, (pentamethylcyclopentadienyl)(2-phenylindenyl) zirconium difluoride, (pentamethylcyclopentadienyl)(2-methyl-4phenylindenyl) zirconium difluoride, (pentamethylcyclopentadienyl)(2-methylbenzindenyl) zirconium difluoride, (pentamethylcyclopentadienyl)(2,4,6-trimethylindenyl) zirconium difluoride, (pentamethylcyclopentadienyl)(2,4,7-trimethylindenyl) zirconium difluoride, (pentamethylcyclopentadienyl)(4,7-dimethylindenyl) zirconium difluoride, (pentamethylcyclopentadienyl)(fluorenyl) zirconium difluoride, (1,2,3,4-tetramethyl-5-propylcyclopentadienyl)(indenyl) zirconium difluoride, (1,2,3,4-tetramethyl-5-propylcyclopentadienyl)(2-methylindenyl) zirconium difluoride, (1,2,3,4-tetramethyl-5-propylcyclopentadienyl)(2-ethylindenyl) zirconium difluoride, (1,2,3,4-tetramethyl-5-propylcyclopentadienyl)(2-propylindenyl) zirconium difluoride, (1,2,3,4-tetramethyl-5-propylcyclopentadienyl)(2-isopropylindenyl) zirconium difluoride, (1,2,3,4-tetramethyl-5-propylcyclopentadienyl)(2-butylindenyl) zirconium difluoride, (1,2,3,4-tetramethyl-5-propylcyclopentadienyl)(2-isobutylindenyl) zirconium difluoride, (1,2,3,4-tetramethyl-5-propylcyclopentadienyl)(2-phenylindenyl) zirconium difluoride, (1,2,3,4-tetramethyl-5-propylcyclopentadienyl)(2-methyl-4-phenylindenyl) zirconium difluoride, (1,2,3,4-tetramethyl-5-propylcyclopentadienyl)(2-methylbenzindenyl) zirconium difluoride, (1,2,3,4-tetramethyl-5-propylcyclopentadienyl)(2,4,6-trimethylindenyl) zirconium difluoride, (1,2,3,4-tetramethyl-5-propylcyclopentadienyl)(2,4,7-trimethylindenyl) zirconium difluoride, (1,2,3,4-tetramethyl-5-propylcyclopentadienyl)(4,7-dimethylindenyl) zirconium difluoride, (1,2,3,4-tetramethyl-5-propylcyclopentadienyl)(fluorenyl) zirconium difluoride, (1-ethyl-2,3,4,5-tetramethylcyclopentadienyl)(indenyl) zirconium difluoride, (1-ethyl-2,3,4,5-tetramethylcyclopentadienyl)(2-methylindenyl) zirconium difluoride, (1-ethyl-2,3,4,5-tetramethylcyclopentadienyl)(2-ethylindenyl) zirconium difluoride, (1-ethyl-2,3,4,5-tetramethylcyclopentadienyl)(2-propylindenyl) zirconium difluoride, (1-ethyl-2,3,4,5-tetramethylcyclopentadienyl)(2-isopropylindenyl) zirconium difluoride, (1-ethyl-2,3,4,5-tetramethylcyclopentadienyl)(2-butylindenyl) zirconium difluoride, (1-ethyl-2,3,4,5-tetramethylcyclopentadienyl)(2-isobutylindenyl) zirconium difluoride, (1-ethyl-2,3,4,5-tetramethylcyclopentadienyl)(2-phenylindenyl) zirconium difluoride, (1-ethyl-2,3,4,5-tetramethylcyclopentadienyl)(2-methyl-4-phenylindenyl) zirconium difluoride, (1-ethyl-2,3,4,5-tetramethylcyclopentadienyl)(2-methylbenzindenyl) zirconium difluoride, (1-ethyl-2,3,4,5-tetramethylcyclopentadienyl)(2,4,6-trimethylindenyl) zirconium difluoride, (1-ethyl-2,3,4,5-tetramethylcyclopentadienyl)(2,4,7-trimethylindenyl) zirconium difluoride, (1-ethyl-2,3,4,5-tetramethylcyclopentadienyl)(4,7-dimethylindenyl) zirconium difluoride, (1-ethyl-2,3,4,5-tetramethylcyclopentadienyl) (fluorenyl) zirconium difluoride and so on.

The aluminoxane used in the catalyst composition of the present invention acts as an activator or cocatalyst, and it can be a conventional methyl aluminoxane (MAO) or modified methyl aluminoxane (MMAO) which is known to be suitable for olefin polymerization, and in addition, can be any commercially available aluminoxane. Typical linear aluminoxanes are represented by the following Formula 3 or 4, and typical circular aluminoxanes are represented by the following Formula 5.

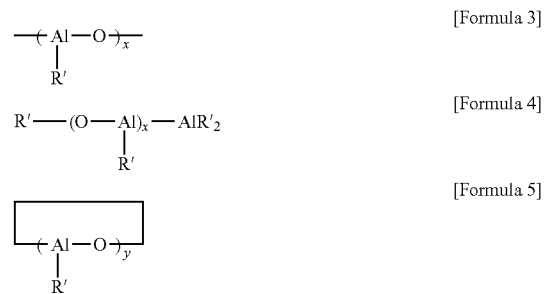

In formulas 3, 4 and 5, R' is a hydrocarbon radical, preferably a linear or branched alkyl radical of 1 to 10 carbon atoms. In these formulas, most of R 'is preferably a methyl group, and all of R' may be a methyl group. More preferably, 30 to 100%, and most preferably 50 to 70% of R' is a methyl group. x is an integer of 1 to 50, preferably 4 to 30, and y is an integer of 3 to 50, preferably 4 to 30.

As the aluminoxane, commercially available alkylaluminoxane may be used. Non-limiting examples of the alkyl-aluminoxane include methylaluminoxane, ethylaluminoxane, butylaluminoxane, isobutylaluminoxane, hexylaluminoxane, octylaluminoxane, decylaluminoxane, and the like. The aluminoxane is commercially available in the form of various kinds of hydrocarbon solutions. Among them, it is preferable to use an aromatic hydrocarbon solution of aluminoxane. It is more preferable to use an aluminoxane solution dissolved in toluene. The aluminoxane may be used alone or in combination of two or more. The aluminoxane may be prepared by adding an appropriate amount of water to trialkylaluminum or reacting a hydrocarbon compound containing water or inorganic hydrate salt with trialkylaluminum. Generally, the aluminoxane is in the form of hydrocarbyl aluminoxanes of linear and/or circular oligomers.

In the catalyst composition of the present invention, the first organometallic compound, the second organometallic compound and aluminoxane may be supported on a conventional organic or inorganic carrier. Thus, the catalyst composition of the present invention may exist in the form supported on an organic or inorganic porous carrier or in the form of an insoluble particle of the carrier as well as in the form of a solid powder or a homogeneous solution. As the carrier, porous particles of a stable structure such as inorganic oxides or inorganic salts can be used without limitation. Practically useful carriers are inorganic oxides of elements belonging to Groups 2, 3, 4, 5, 13 or 14 of the Periodic Table. It is desirable that such carriers are silica, alumina, silica-alumina, or mixtures thereof, clay or modified clay, or mixtures thereof. It is more preferable to use spherical silica in the form as the carrier. In the inorganic oxide carrier water or a hydroxyl group must be removed therefrom before use, which can be done by heat treatment. The heat treatment of the carrier is performed by heating the carrier at a temperature of 200 to 800° C. while fluidizing the same in a vacuum or nitrogen atmosphere. The carrier used is in the form of a dried powder, whose average particle size is about 1 to 250 μm, preferably 10 to 150 μm, and whose surface area is about 5 to 1200 m$^2$/g, preferably about 50 to 500 m$^2$/g. The pore volume of the carrier is 0.1 to 5 cm$^3$/g, preferably 0.1 to 3.5 cm$^3$/g, The pore size of the carrier is about 5 to 50 nm, preferably 7.5 to 35 nm. The hydroxy present on the surface of the carrier is preferably about 0 to 3 mmol per gram of silica, more preferably 0.5 to 2.5 mmol.

The amount of such a hydroxy group depends on the dehydration or the calcining temperature of the carrier.

The catalyst composition according to the present invention may further contain a modifier, if necessary. The modifier acts as a scavenger of free trialkyl aluminum in an aluminoxane solution known to cause fouling or sheeting of the reactor which inhibits process stability, and also serves as a coupling agent of aluminoxane for improving the catalytic activity. In the present invention, the modifier may be a phenol compound represented by the following Formula 6 (See: Korean Patent No. 531,600).

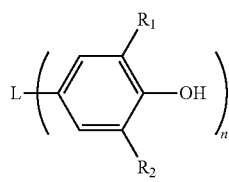

[Formula 6]

In Formula 6, $R_1$, $R_2$ and L are each independently hydrogen or an alkyl group, an alkoxy group, an aryl group, an aryloxy group, an alkenyl group, an arylalkyl group, an alkylaryl group, an arylalkenyl group, a cycloalkyl group, a cycloalkylalkenyl group, a heteroaryl group, a heterocycloalkyl group of 1 to 10 carbon atoms, an alkyl group of 1 to 5 carbon atoms in which an alkyl group of 1 to 20 carbon atoms is bonded via —S—, —$PO_3$=, —CON—, —COO— and/or —O—, or a heteroarylamine group, and n is an integer of 1 to 4. Preferably, $R_1$ and $R_2$ are hydrogen or an alkyl group of 1 to 10 carbon atoms, and more preferably hydrogen, a methyl group or a tert-butyl group. When n is 2 or more, it is preferable that L is an aryl group of 6 to 12 carbon atoms as a linking agent.

In the polyolefin polymerization catalyst composition according to the present invention, the amount of the second organometallic compound represented by the Formula 2 is 0.05 to 1.0 mol, preferably 0.1 to 0.5 mol, and more preferably 0.15 to 0.45 mol, with respect to 1 mol of the first organometallic compound represented by the Formula 1. If the amount of the second organometallic compound represented by the Formula 2 is too small, the moldability of the polyolefin resin may deteriorate or the physical properties of the molded article may be deteriorated. If the amount of the same is too large, the process stability may be deteriorated, or the haze may increase and the quality may deteriorate. The aluminoxane can be used such that the amount of aluminum mixed with aluminoxane is 1 to 100,000 moles, preferably 1 to 5,000 moles, and more preferably 1 to 2,500 moles, with respect to the sum 1 mole of the first organometallic compound represented by Formula 1 and the second organometallic compound represented by Formula 2. The amount of the carrier to be used can be appropriately controlled in accordance with the characteristics of the required catalyst. Typically, with respect to 100 parts by weight of the carrier, the content of aluminum (Al) derived from the aluminoxane compound is 5 to 30 parts by weight, preferably 7 to 20 parts by weight, and the content (supported amount) of the hafnium component derived from the first organometallic compound is 0.01 to 2, preferably 0.05 to 1.5 parts by weight, and the content of the zirconium component derived from the second organometallic compound is 0.01 to 1 part by weight, preferably 0.02 to 0.1 part by weight. The use amount of the modifier is about 0.1 to 15% by weight, preferably about 0.2 to 8% by weight, more preferably about 1 to 4% by weight, with respect to the total weight of the catalyst composition. If the amount of the modifier to be used is too small, the —OH group contained in the modifier may not sufficiently react with aluminoxane, thereby reducing the preventive effect of the fouling or sheeting of the reactor. If the amount of the modifier used is too large, the effect of preventing fouling or sheeting is increased, but excessive —OH groups contained in the modifier may react with the metallocene catalyst component as well as aluminoxane, thereby reducing the catalytic activity.

The catalyst composition according to the present invention can be prepared by various methods. The non-limiting method of contacting (supporting) the catalyst component with the porous carrier is as follows. For example, the method for preparing the catalyst composition in solid powder form comprises the steps of: mixing the first organometallic compound, the second organometallic compound, and the aluminoxane to prepare a catalyst in the form of a solution, then which is contacted with the porous carrier (for example, the silica carrier having a pore size of 5 to 50 nm and a pore volume of 0.1 to 5.0 $cm^3/g$) to form a slurry state; applying an acoustic wave or a vibration wave having a frequency range of 1 to 10,000 kHz, preferably 20 to 500 kHz to the slurry mixture for a period of 0.1 to 18 hours, preferably 0.5 to 6 hours at 0 to 120° C., preferably at 0 to 80° C. to uniformly penetrate the catalyst components deep into the micropores of the porous carrier; and vacuum-treating or drying in a nitrogen stream the catalyst components permeated into the micropores of the porous carrier. The acoustic wave or vibration wave is preferably ultrasonic waves. The method of contacting the catalyst with the support (supporting method) further comprises a step of washing the supported catalyst with hydrocarbon compounds selected from the group consisting of pentane, hexane, heptane, isoparaffin, toluene, xylene and mixtures thereof after the acoustic wave or vibration wave is applied. When the catalyst for polyolefin polymerization used in the present invention is supported on a carrier, the respective component in the catalyst compositions is the same as that in the catalyst composition of the solution or solid state.

Next, a method for producing an olefin according to the present invention will be described. The catalyst composition exists not only in a homogeneous solution state but also in the form of an organic or inorganic porous carrier-supported form or an insoluble particle form of the carrier so that the polyolefin according to the present invention can be polymerized in a liquid phase reaction, a slurry phase reaction, a bulk phase reaction or a gas phase reaction. Each polymerization reaction condition can be appropriately modified depending on the state of the catalyst used (homogeneous or heterogeneous phase (supported type)), a production method (solution polymerization, slurry polymerization, gas phase polymerization), an aimed polymerization result or a shape of the polymer. If the polymerization is carried out in liquid phase or slurry, the solvent or olefin itself may be used as the medium. Examples of the solvent include propane, butane, isobutane, pentane, hexane, octane, decane, dodecane, cyclopentane, methylcyclopentane, cyclohexane, benzene, toluene, xylene, dichloromethane, chloroethane, 1,2-dichloroethane, chlorobenzene, and the like. These solvents can be mixed at a predetermined rate. In addition, an impurity scavenger may be optionally added to increase the productivity of the polyolefin together with the catalyst composition of the present invention. Example of the impurity scavenger includes triethylaluminium and the like. In the polymerization or copolymerization of the polyolefin of the present invention, the amount of the first and second organometallic compounds is not particularly limited, but the concentration of the central metal of the first and second organometallic compounds in the reaction system used for polymerization is preferably $10^{-8}$ to 10 mol/l, more preferably $10^{-7}$ to $10^{-2}$ mol/l.

The polyolefin resin according to the invention may be a homopolymer obtained by polymerizing ethylene as the olefin monomer alone or a copolymer obtained by copolymerizing ethylene and an alpha-olefin. As the comonomer, an alpha-olefin having 3 or more carbon atoms may be used. Examples of the comonomer having 3 or more carbon atoms include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene or 1-eicosene and mixtures thereof. The content of the alpha-olefin comonomer may be from 1 to 4 mol %, preferably from 1.4 to 4 mol %, based on the ethylene and alpha-olefin copolymer. In the polymerization or copolymerization of olefins according to the present invention, the polymerization temperature is not particularly limited, since it may vary depending on the reactants, reaction conditions, etc., but is conventionally 60 to 110° C. For example, the polymerization temperature is from 0 to 250° C., preferably from 10 to 200° C., when solution polymerization is carried out, and from 0 to 120° C., preferably from 20 to 110° C. when slurry or gas phase polymerization is carried out. The polymerization pressure is from atmospheric pressure to 500 kgf/cm$^2$, preferably from atmospheric pressure to 60 kgf/cm$^2$, more preferably from 10 to 60 kgf/cm$^2$. The polymerization may be carried out batchwise, semi-continuously or continuously. The polymerization can also be carried out in two or more stages with different reaction conditions. The molecular weight and molecular weight distribution of the final polymer prepared according to the present invention can be controlled by varying the polymerization temperature or by injecting hydrogen into the reactor.

The polyolefin resin according to one embodiment of the present invention satisfies the following properties (i) to (v).

(i) Melt Flow Index (MIE or MI2.16, measured according to ASTM D1238) measured at 190° C. under a load of 2.16 kg: 0.1 to 1.5 g/10 min, preferably 0.5 to 1.2 g/10 min (ii) density: 910 to 930 kg/m$^3$, preferably 914 to 928 kg/m$^3$ (iii) Ratio (Mw/Mn, MWD, Poly Distribution) of Weight average molecular weight (Mw) to Number average molecular weight (Mn) measured by Gel Permeation Chromatography (GPC): 3.0 to 7.0, preferably 3.2 to 6.0

(iv) Ratio (Mz/Mw, MWD) of the Z-average molecular weight (Mz) to the weight-average molecular weight (Mw) measured by Gel Permeation Chromatography (GPC): 2.2 to 4.5, preferably 2.4 to 3.4

(v) In TREF (Temperature Rising Elution Fractionation, TREF) of multimodal distribution, the weight percentage (wt %) sum (A) and the density (D, unit: kg/m$^3$) of components eluted at a temperature range of 43 to 71° C. satisfies the following Equation 1.

$$A > -2.5*(D)+2325 \qquad \text{[Equation 1]}$$

In the polyolefin resin of the present invention, if the melt flow index (MI2.16), density and molecular weight distribution (Mw/Mn, Mz/Mw) are out of the above range, it is difficult to simultaneously satisfy the processability and physical properties. The TREF curves of multimodal distribution in the above-mentioned show the chemical composition distribution of the polymer, in which peaks on relatively low temperature side indicate that there are many branches (chains), while peaks on relatively high temperature side indicate less branches (chains). When the above Equation 1 is satisfied, the ratio of the polymer having a large number of short chain branches (SCB) in the molecular chain becomes more high than a polyolefin resin made of a metallocene having a narrow comonomer distribution, so that a polyolefin resin having excellent impact strength properties of a molded article can be provided by Tie Molecules between molecular chains.

The polyolefin resin according to another embodiment of the present invention satisfies the above properties (i) to (iv) and the following property of (vi).

(vi) When the TREF curve of multimodal distribution is deconvoluted, the area of the TREF curve having a peak at 50 to 74° C. is 40 to 75% of the total area of the TREF curve of multimodal distribution, more preferably 45 to 70%. Deconvolution of the TREF curve means separating the TREF curve into a plurality of individual peaks. The total area of the TREF curve of multimodal distribution may be an area by the entire TREF curve before deconvolution or an area by the entire curve by summing a plurality of individual peaks when deconvoluted. In the polyolefin resin according to the present invention, the number of deconvoluted peaks in the TREF curve is, for example, 2 to 5, preferably 3 to 5. The area of the TREF peak located at 50 to 74° C. in the above TREF curve of multimodal distribution means the amount of a copolymer with many branches derived from a comonomer, and when the proper amount of the copolymer with many branches at long chain contained, the dart falling impact strength and the processability can be simultaneously satisfied. When the deconvolution characteristic (vi) of the TREF curve of multimodal distribution is satisfied, the dart falling impact strength and the processability can be satisfied at the same time. If, in the deconvolution characteristic (vi) of the TREF curve, the area of the TREF curve having a peak located at 50 to 74° C. is less than 40%, mechanical properties may deteriorate, and if the TREF curve exceeds 75%, the melting point is lowered due to a low density, which may lower the process stability.

The polyolefin resin according to another embodiment of the present invention satisfies the above properties (i) to (iv) and the following properties of (vii) and (viii).

(vii) COI (Comonomer Orthogonal Index) value calculated by following Equation 2: 4.5 to 18, preferably 5 to 16, more preferably 6 to 14

$$\text{comonomer orthogonal index } (COI) = \frac{SCB \text{ number in } Mz - SCB \text{ number in } Mn}{\log Mz - \log Mn} \qquad \text{[Equation 2]}$$

COI is a measure showing how the content of comonomer such as alpha-olefin is distributed according to molecular weight. The COI can be calculated from Z-Average Molecular Weight (Mz), Number-Average Molecular Weight (Mn), amount of SCB (Short Chain Branch) in Mz (Number of side branches per 1,000 pieces of carbon, unit: pieces/1,000C) and amount of SCB in Mn, which are measured by Gel Permeation Chromatography with IR detector (GPC-IR). In the above Equation 2, Mz and Mn are the Z-average molecular weight and the number average molecular weight of the polyolefin resin measured by GPC equipped with an IR detector, respectively, and the number of SCB in Mz and the number of SCB in Mn Represent the number of average side branches derived from comonomers per 1,000 carbons in Z-average molecular weight (Mz) and number-average molecular weight (Mn), respectively. The SCB means side branches attached to the main chain derived from the alpha-olefin when the alpha-olefin is used as a comonomer in the ethylene polymerization process. The side branches include both SCB having 1 to 6 carbon atoms and LCB (Long Chain Branch) having 7 or more carbon atoms.

When the value of COI is positive, it means that the polymer has a higher comonomer content in the high molecular weight region as compared with the low molecular weight region. On the contrary, when the value of COI is negative, it means that the polymer has a higher comonomer content in the low molecular weight region as compared with the high molecular weight region. The COI value of the polyolefin according to the present invention, calculated by the above method is about 4.5 to 18, preferably about 5 to 16, more preferably about 6 to 14. When the COI value is less than 4.5, the mechanical properties of the polymer may be deteriorated due to the low BOCD (Broad Orthogonal Composition Distribution) property. When the COI value is more than 18, the mechanical properties of the polymer are excellent due to the high BOCD property, however, there is a fear that the quality of the molded article may deteriorate due to the increase in haze and the generation of fish eyes when the film is produced from such a polymer because the miscibility between the polymer components is lowered. That is, the polyolefin resin according to the present invention shows such BOCD characteristic that the SCB content is low in a low molecular weight region and the SCB content is relatively high in a high molecular weight region, slope thereof being within the range of the above COI value.

Also, the polyolefin according to the present invention has 3 to 20, preferably 5 to 20 of average number of SCBs per 1000 carbon atoms (1000 C) (B) at the entire range of molecular weight measured. The average number of SCBs per 1,000 carbons (B) in the entire range of molecular weight is a measure of the amount of average comonomer contained in the polyolefin resin. Accordingly, (viii) the average number of SCBs per 1000 carbon atoms (1000 C) (B) and the density (D, unit: kg/m$^3$) in the polyolefin resin of the present invention satisfy the following Equation 3 in the entire range of molecular weight.

$$B > -0.6*(D) + 563 \quad \text{[Equation 3]}$$

When the COI value is within the above range and the Equation 3 is satisfied, and the Mw/Mn is 1 to 3, being narrow, the physical properties of the polyolefin resin are optimized to exhibit high impact strength and good mechanical properties. However, in this case, since the processability is lowered, it is preferable that the molecular weight distribution (Mw/Mn) is increased to from 3.0 to 7.0. Therefore, when the following conditions are satisfied in the polyolefin of the present invention, the dart falling impact strength and processability can be satisfied at the same time. The conditions are: COI value, melt flow index, density, etc. are within the above-mentioned range; Mw/Mn is 3.0 to 7.0; Mz/Mw is 2.2 to 4.5; and when the TREF curve of multimodal distribution is deconvoluted, the area of the TREF curve having a peak at 50 to 74° C. is 40 to 75% of the total area of the TREF curve of multimodal distribution.

According to the present invention, polymerization is carried out in a single reactor by using a catalyst composition comprising two or more organometallic compounds having different molecular weights and comonomer incorporation abilities to produce polyolefins having a suitable molecular weight distribution and a new composition of BOCD structure so that both the processability (for example, low extrusion load during processing) and the dart falling impact strength of the polyolefin resin can be improved. The polyolefin resin produced according to the present invention is a linear low density polyolefin resin having such a molecular weight-comonomer composition distribution that the content of the comonomer in the high molecular weight portion is high and the content of the comonomer in the low molecular weight portion is very low.

Hereinafter, the present invention will be described in more detail by way of examples. The following examples are intended to further illustrate the present invention, and the scope of the present invention is not limited by these examples. In the following Preparations, Examples and Comparative Examples, the catalyst was prepared by the Schlenk technique in which air and moisture were totally shielded, and specifically the treatment and manipulation of air-sensitive substances such as air-sensitive reagents and materials were carried out using a Schlenk line or in a glove box filled with nitrogen. The reagents were typically purchased from Sigma-Aldrich Chemical Company, used without further purification, and purified dry nitrogen was used as the inert gas. Bis (normal-propylcyclopentadienyl) hafnium dichloride was available from MCN Material Technologies Co., Ltd. and so on. All solvents were dried using sodium metal or calcium hydride in an inert nitrogen atmosphere. In the present specification and Examples, the measurement method of each property is as follows.

(1) Melt Flow Index (MIE, MI2.16): Measured at 190° C., under a load of 2.16 kg according to ASTM D1238(unit: g/10 min)

(2) High load Melt Flow Index (MIF, MI21.6): Measured at 190° C., under a load of 2.16 kg according to ASTM D1238 (unit: g/10 min), Melt Flow Index ratio (SR): MIF/MIE (F/E)

(3) Density: Measured by density gradient method according to ASTM D1505

(4) Molecular weight and molecular weight distribution: Measured using Gel Permeation Chromatography with Refractive Index Detector (RI Detector) (Gel Permeation Chromatography-RI; GPC-RI; Polymer Laboratory Inc. 220 System) as follows. Two Olexis and one Guard were used as the separation column, and the column temperature was maintained at 160° C. Calibration was performed using a standard polystyrene set from Polymer Laboratory Inc. Trichlorobenzene containing 0.0125% by weight of antioxidant (BHT) was used as an eluent. The measurement was carried out for 27 minutes in a condition of the sample concentration being 1.0 mg/mL, the injection amount being 0.2 mL and a pump flow rate being 1.0 mL/min. The number average molecular weight (Mn), the weight average molecular weight (Mw) and the Z-average molecular weight (Mz) were universally calibrated using Polystyrene standard materials of Easical A and Easical B (manufactured by Agilent). Thereafter, it was calculated in terms of polyethylene.

(5) TREF curve: The analysis was carried out using Cross-Fractionation Chromatography (CFC; PolymerChar CFC-2) as follows. Two Olexis and one Guard were used as the separation column, and the column temperature was maintained at 150° C. Calibration was performed using a standard polystyrene set from Polymer Laboratory Inc. Trichlorobenzene containing 0.0125% by weight of antioxidant (BHT) was used as an eluent. The sample concentration was 75 mg/mL and the pump flow rate was 1.0 mL/min. After the sample was injected, the oven and the sample were heated to 150° C. at a heating rate of 40° C./min and maintained at 150° C. for 60 minutes. Thereafter, the sample was lowered to 95° C. at a cooling rate of 40° C./min. The sample was kept at 95° C. for 45 minutes, cooled to 30° C. at a cooling rate of 0.5° C./min, and kept for 30 minutes. Thereafter, the sample is raised from 35° C. to 120° C. At this time, 22 temperature-dependent fractions are formed at intervals of 4° C., and 0.5 ml of sample is injected into each fraction. The eluted fractions were passed through a TREF column and an Olexis column to obtain TREF values and molecular weights simultaneously. The molecular weight was universally calibrated using polystyrene standard materials of Easical A and Easical B (manufactured by Agilent), and it was calculated in terms of polyethylene. Data processing was performed using "CFC Calibration", which is a device-attached analysis program. The analysis took about 600 minutes, and an infrared spectrometer was used as a detector.

(6) Deconvoluted TREF Peak located within the range of 50 to 74° C.: In the TREF curve of multimodal distribution showing dW/dT (W: amount to be eluted, T: temperature) depending on temperature using CFC, the TREF curve was deconvoluted to a plurality of individual peaks using a Gaussian function in the OriginPro 8.6 program, while ignoring the amount released at 35° C. At this time, the coefficient of determination (R^2) is 0.99 to 1, and each peak area should have a positive value of 0 or more. Thereafter, a peak located at 50 to 74° C. was taken and the area of the peak was calculated in comparison with the total area.

(7) Molecular weight-Comonomer distribution and average number of SCB per 1000C: The analysis was carried out using Gel Permeation Chromatography with Infrared Detector (IR Detector) (GPC-IR; Polymer Laboratory Inc. 220 System) as follows. Two Olexis and one Guard were used as the separation column, and the column temperature was maintained at 160° C. Calibration was performed using a standard polystyrene set from Polymer Laboratory Inc. Trichlorobenzene containing 0.0125% by weight of antioxidant (BHT) was used as an eluent. The measurement was carried out for 22 minutes in a condition of the sample concentration being 2.0 mg/mL, the injection amount being 0.5 mL and a pump flow rate being 1.0 mL/min. The molecular weight was universally calibrated using polystyrene standard materials of Easical A and Easical B (manufactured by Agilent), and it was calculated in terms of polyethylene. The average number of SCBs per 1,000 carbons was calculated from the ratio of the intensity ($I_{2,960}/I_{2,928}$ of the $CH_3$ peak located at 2,960 $cm^{-1}$ to the intensity of the $CH_2$ peak located at 2,928 $cm^{-1}$, after receiving a Fourier transformed IR (Fourier transform IR) signal at 3,000 to 2,700 $cm^{-1}$.

(8) COI (Comonomer Orthogonal Index): Mz, Mn and SCB contents were measured using the GPC-IR and the COI value was calculated according to Equation 2. Molecular weight-comonomer distribution curves were drawn in which the log value (log Mw) of the molecular weight (Mw) is taken as the x-axis and the amount of polymer corresponding to the log value (Dw/dlog Mw) and the average number of short chain branches (SCB) derived from the comonomer (number of branches per 1,000 carbon atoms, unit number/1,000C) are taken as the y-axis, respectively. The number of SCBs in Mz represents the number of average side branches derived from comonomers per 1000 carbons in the Z-Average Molecular Weight (Mz), and the number of SCBs in Mn means the number of average side branches derived from comonomers per 1,000 carbons in Number-Average Molecular Weight (Mn).

(9) Dart falling impact strength: Measured according to ASTM D1709

(10) Haze: Measured according to ASTM D1003

[Preparation 1] Preparation of the Second Organometallic Compound (Compound A)

Indene (52.3 g, 450 mmol) was dissolved in hexane (500 mL), followed by thorough mixing, cooling to 0° C. 2.5 M of n-butyllithium (n-BuLi) hexane solution (190 ml, 473 mol) was slowly added to the hexane solution in which indene was dissolved, and then the temperature was gradually raised to room temperature and stirring was performed for 14 hours. After completion of the reaction, the insoluble solid was filtered off, washing with hexane was carried out five times, and the solvent was removed under vacuum to obtain a white solid compound (53.5 g of indene lithium salt, yield 97%).

(Pentamethylcyclopentadienyl)zirconium trichloride (1.7 g, 5 mmol) was dissolved in toluene (30 ml), followed by thorough mixing, cooling to 0° C. Indene lithium salt (0.6 g, 5 mmol) dissolved in toluene (15 ml) was slowly added to a (pentamethylcyclopentadienyl) zirconium trichloride solution, and then the temperature was gradually raised to room temperature and stirring was performed for 14 hours. After completion of the reaction, the insoluble solid was filtered off, washing with hexane was carried out five times, and the solvent was removed under vacuum to obtain a yellow solid compound (pentamethylcyclopentadienyl) zirconium dichloride, yield 92%).

[Preparation 2] Preparation of the Second Organometallic Compound (Compound B)

Sodium methoxide (54.59 g, 1010.6 mmol) was cooled to −78° C. and methanol (MeOH) was slowly added dropwise thereto, followed by slowly raising the temperature to room temperature and stirring the suspension. A solution of methanol (MeOH) in which cyclopentadiene (40 g, 605 mmol) and 2,5-hexadione (48.35 g, 423.6 mmol) were dissolved was slowly added dropwise to the sodium methoxide suspension which is cooled to −10 to −30° C. After stirring at room temperature for 14 hours, diethyl ether was added, and the organic layer was separated using a separating funnel. Sodium sulfate was added to the obtained organic layer, followed by stirring for 10 minutes, followed by filtration. The mixture was distilled under reduced pressure at 0.1 torr and 84° C. to obtain a yellow oil (41 g of 4,7-dimethylindene, yield 47%). The 4,7-dimethylindene (14.5 g, 100.55 mmol) was dissolved in diethyl ether (300 mL), followed by thorough mixing, cooling to 0° C. 2.5 M of n-butyllithium (n-BuLi) hexane solution (42.2 ml, 105.58 mol) was slowly added to the diethyl ether solution in which 4,7-dimethylindene is dissolved, and then the temperature was gradually raised to room temperature and stirring was performed for 14 hours. After completion of the reaction, the insoluble solid was filtered off, washing with hexane was carried out five times, and the solvent was removed under vacuum to obtain a white solid compound (10.8 g of 4,7-dimethylindene lithium salt, yield 71.5%).

(Pentamethyl cyclopentadienyl)zirconium trichloride) (1.9 g, 5.8 mmol) was dissolved in toluene (100 ml), followed by through mixing, cooling to 0° C. To the (pentamethylcyclopentadienyl)zirconium trichoride solution 4,7-dimethylindene (0.9 g, 5.8 mmol) dissolved in toluene (15 ml) was slowly added, and then the temperature was gradually raised to room temperature and stirring was performed for 14 hours. After completion of the reaction, insoluble solid was filtered off, washing with hexane was carried out five times, and the solvent was removed under vacuum to obtain a yellow solid compound ((pentamethylcyclopentadienyl)(4,7-dimethylindenyl) zirconium dichloride, yield: 86%).

[Preparation 3] Preparation of the Second Organometallic Compound (Compound C)

2-methylbenzo(e)indene (1 g, 5.4 mol) was dissolved in hexane (50 mL), followed by thorough mixing, cooling to 0° C. 2.5M of n-butyllithium (n-BuLi) hexane solution (2.4 ml, 6.0 mmol) was slowly added to the hexane solution in which the 2-methylbenzoindene is dissolved, and then the temperature was gradually raised to room temperature and stirring was performed for 14 hours. After completion of the reaction, the insoluble solid was filtered off, washing with hexane was carried out five times, and the solvent was removed under vacuum to obtain a white solid compound (0.99 g of 2-methylbenzindene lithium salt, yield 97%).

(Pentamethylcyclopentadienyl) zirconium trichloride (1.73 g, 5.2 mmol) was dissolved in toluene (100 ml), followed by thorough mixing, cooling to 0° C. 2-methylbenzindene lithium salt (0.99 g, 5.2 mmol) dissolved in toluene (15 ml) was slowly added to (pentamethylcyclopentadienyl) zirconium trichloride solution, and then the temperature was gradually raised to room temperature and stirring was performed for 14 hours. After completion of the reaction, the insoluble solid was filtered off, washing with hexane was carried out five times, and the solvent was removed under vacuum to obtain a yellow solid compound ((pentamethylcyclopentadienyl)(2-methylbenzindenyl) zirconium dichloride, yield: 60%).

[Preparation 4] Preparation of the Second Organometallic Compound (Compound D)

2,4,6-trimethylindene (2 g, 13 mmol) was dissolved in hexane (100 mL), followed by through mixing, cooling to 0° C. 2.5M of n-butyllithium (n-BuLi) hexane solution (5.6 ml, 14 mmol) was slowly added to the hexane solution in which the indene was dissolved. Then, the temperature was gradually raised to room temperature and stirring was performed for 14 hours. After the completion of the reaction, the insoluble solid was filtered off, washing with hexane was carried out five times, and the solvent was removed under vacuum to obtain a white solid compound (2,4,6-trimethylindend lithium salt 2 g, yield: 94%).

(Pentamethylcyclopentadienyl)zirconium trichloride) (2 g, 6.1 mmol) was dissolved in toluene (100 ml), followed by thorough mixing, cooling to 0° C. 2,4,6-trimethylindene lithium salt (1 g, 6.1 mmol) dissolved in toluene (15 ml) was slowly added to the (pentamethylpentadienyl) zirconium trichloride solution, and the temperature was slowly raised to room temperature and stirring was performed for 14 hours. After the completion of the reaction, insoluble solid was filtered off, washing with hexane was carried out five times and the solvent was removed under vacuum to obtain a yellow solid compound ((pentamethylcyclopentadienyl)(2,4,6-trimethylindenyl) zirconium dichloride, yield: 51%).

[Preparation 5] Preparation of the Second Organometallic Compound (Compound E)

Indene (52.3 g, 450 mmol) was dissolved in hexane (500 mL), followed by thorough mixing, cooling to 0° C. 2.5M of n-butyllithium (n-BuLi) hexane solution (190 ml, 473 mol) was slowly added to the hexane solution in which Indene was dissolved, and the temperature was slowly raised to room temperature and stirring was performed for 14 hours. After the completion of the reaction, insoluble solid was filtered off, washing with hexane was carried out five times and the solvent was removed under vacuum, to obtain a white solid compound (Indene lithium salt 53.5 g, yield: 97%).

(1,2,3,4-tetramethyl-5-propylcyclopentadienyl)zirconium trichloride) (1.2 g, 4.2 mmol) was dissolved in toluene (100 ml), followed by through mixing and cooling to 0° C. Indene lithium salt (0.5 g, 4.2 mmol) dissolved in toluene (15 ml) was slowly added to the (1,2,3,4-tetramethyl-5-propylcyclopentadienyl) zirconium trichloride solution, and the temperature thereof was slowly raised to room temperature and stirring was carried out for 14 hours. After the completion of the reaction, insoluble solid was filtered off, washing with hexane was performed five times and the solvent was removed under vacuum, to obtain a yellow solid compound ((1,2,3,4-tetramethyl-5-propylcyclopentadienyl) (indenyl) zirconium dichloride, yield: 57%).

[Preparation 6] Preparation of the Second Organometallic Compound (Compound F)

2,4,7-trimethylindene (2 g, 13 mmol) was dissolved in hexane (100 mL), followed by thorough mixing, cooling to 0° C. 2.5M of n-butyllithium (n-BuLi) hexane solution (5.6 ml, 14 mmol) was slowly added to hexane solution in which indene was dissolved, and the temperature thereof was slowly raised to room temperature and stirring was performed for 14 hours. After the completion of the reaction, insoluble solid was filtered off, washing with hexane was made five times and the solvent was removed under vacuum, to obtain a white solid compound (2-methyl-4-phenylindene lithium salt 1.86 g, yield: 93%).

(Pentamethylcylopentadienyl) zirconium trichloride) (2.4 g, 7.3 mmol) was dissolved in toluene (100 ml), followed by thorough mixing, cooling to 0° C. 2,4,7-trimethylindene lithium salt (1.2 g, 7.3 mmol) dissolved in toluene (15 mL) was slowly added to the (pentamethylcyclopentadienyl) zirconium trichloride solution, and the temperature thereof was slowly raised to room temperature and stirring was performed for 14 hours. After the completion of the reaction, insoluble solid was filtered off, washing with hexane was carried out five times and the solvent was removed under vacuum, to obtain a yellow solid compound ((pentamethylcyclopentadienyl)(2,4,7-trimethylindenyl) zirconium dichloride, yield: 63%).

[Examples 1 to 8] Preparation of Catalyst Composition

As described in Table 1 below, to a 250 ml flask in a nitrogen atmosphere were added bis(1-propylcyclopentadienyl) hafnium dichloride (manufactured by MCN) as the first organometallic compound, the second organometallic compounds prepared in Preparation Examples 1 to 6, methylaluminoxane (MAO, Albemarle Corporation, 20% toluene solution) and hexane, and optionally ethanox 330 (product name: Ethanox®330 (Ethanox 330), 1,3,5-trimethyl-2,4,6-tris(3,5-di-ter-butyl-4-hydroxybezil)benzen, Albemarle Corporation), and then stirring was performed. After stirring at room temperature for 1 hour, silica calcined at 250° C. ($SiO_2$, product name: ES70X, PQ corporation) was added, followed by applying ultrasonic wave for 2 hours and then a supernatant was removed. The remaining solid particles were washed twice with hexane, followed by vacuum drying to prepare a free-flowing solid powder supported catalyst. The amount of the second organometallic compound to be added was controlled in the range of 5 to 35 mol % with respect to the first organometallic compound, considering respective activity. The aluminum content of the supported catalyst was 10 to 16.5 wt %, and the hafnium content was 0.25 to 0.45 wt %. The molar ratio of aluminum to metal was adjusted from 230 to 650.

[Comparative Example 1] Preparation of Catalyst Composition

As described in Table 1 below, to a 250 ml flask in a nitrogen atmosphere were added bis(1-propylcyclopentadienyl) hafnium dichloride (manufactured by MCN) as the first organometallic compound, bis(1-butyl-3-methylcyclopentadienyl)zirconium dichloride (Compound G, manufactured by SPCI Industries) as the second organometallic compound, methylaluminoxane (MAO, Albemarle Corporation, 20% toluene solution) and hexane, and then stirring was performed. After stirring at room temperature for 1 hour, silica calcined at 250° C. (SiO$_2$, product name: ES70X, PQ corporation) was added, followed by applying ultrasonic wave for 2 hours and then a supernatant was removed. The remaining solid particles were washed twice with hexane, followed by vacuum drying to prepare a free-flowing solid powder supported catalyst.

TABLE 1

|  | First organometallic compound | | Second organometallic compound | | MAO | Hexane | Silica | Ethanox ® 330 |
|---|---|---|---|---|---|---|---|---|
|  | Type | (mg) | Type | (mg) | (ml) | (ml) | (g) | (mg) |
| Example 1 | (n-PrCp)$_2$HfCl$_2$ | 53.0 | compound A | 11.8 | 10.08 | 4.2 | 3 | 0.15 |
| Example 2 | (n-PrCp)$_2$HfCl$_2$ | 46.3 | compound A | 17.7 | 10.08 | 4.2 | 3 | 0.15 |
| Example 3 | (n-PrCp)$_2$HfCl$_2$ | 53.0 | compound A | 11.8 | 10.08 | 4.2 | 3 | 0 |
| Example 4 | (n-PrCp)$_2$HfCl$_2$ | 33.1 | compound B | 10.6 | 6.72 | 2.8 | 2 | 0.1 |
| Example 5 | (n-PrCp)$_2$HfCl$_2$ | 33.1 | compound C | 11.4 | 6.72 | 2.8 | 2 | 0.1 |
| Example 6 | (n-PrCp)$_2$HfCl$_2$ | 28.7 | compound D | 15.1 | 6.72 | 2.8 | 2 | 0.1 |
| Example 7 | (n-PrCp)$_2$HfCl$_2$ | 33.1 | compound E | 10.5 | 6.72 | 2.8 | 2 | 0.1 |
| Example 8 | (n-PrCp)$_2$HfCl$_2$ | 28.7 | compound F | 15.1 | 6.72 | 2.8 | 2 | 0.1 |
| Comparative Example 1 | (n-PrCp)$_2$HfCl$_2$ | 22.1 | compound G | 20.6 | 6.72 | 2.8 | 2 | 0 |

[Examples 1-1 to 1-8, Comparative Example 1-1] Polyethylene Copolymerization and Physical Property Evaluation In order to control the polymerization temperature, a 2 L-stainless autoclave reactor equipped with a jacket capable of supplying external cooling water was purged 10 times with nitrogen at room temperature, and the temperature was raised to 78° C. The nitrogen purge was again carried out 10 times, and finally the feed line and the reactor were purged with 400 mL of isobutane and 10 bars of ethylene. After the temperature of the reactor was adjusted to 70° C., 0.6 to 1.5 mL of 0.2 M triethylaluminum, 6.67 ppm of an antistatic agent (Statsafe® 3000, Innospec Inc.) and 1 L of isobutane were charged into the reactor. Then, after ethylene and 1-hexene were added, the supported catalysts prepared in Examples 1 to 8 and Comparative Example 1 were charged into a reactor. According to the following Table 2, the catalyst composition, ethylene and 1-hexene (wt. %, Charged amount of 1-hexene to ethylene introduced), hydrogen (mg/kgC2, input amount (mg) of hydrogen to 1 kg of ethylene introduced) was charged, and the polymerization was carried out while maintaining the total pressure of the reactor at each temperature. During the polymerization, the partial pressure of ethylene was kept constant, and 1-hexene and hydrogen were continuously fed in conjunction with ethylene. After the polymerization was completed, the unreacted 1-hexene and isobutane were discharged, and the reactor was opened to recover the copolymer having free flow. The physical properties of the obtained polyolefin resin were measured and are shown in Table 5 below.

TABLE 2

|  | Example 1-1 | Example 1-2 | Example 1-3 | Example 1-4 | Example 1-5 | Example 1-6 | Example 1-7 | Example 1-8 | Comparative Example 1-1 |
|---|---|---|---|---|---|---|---|---|---|
| Catalyst | Example 1 | Example 2 | Example 3 | Example 4 | Example 5 | Example 6 | Example 7 | Example 8 | Comparative Example 1 |
| 0.2M TEAL(ml) | 0.8 | 0.8 | 0.8 | 0.8 | 0.8 | 0.8 | 0.8 | 1.0 | 0.8 |
| Polymerization temperature (° C.) | 75 | 75 | 75 | 75 | 75 | 75 | 75 | 75 | 75 |
| Polymerization time(min) | 120 | 120 | 120 | 120 | 120 | 120 | 120 | 120 | 120 |
| Ethylene (psig) | 100 | 100 | 130 | 130 | 130 | 130 | 130 | 130 | 130 |
| Initial input 1-hexene (ml) | 40 | 40 | 44 | 36 | 36 | 38 | 36 | 36 | 42 |
| 1-hexene (wt %) | 10 | 10 | 10 | 8 | 8 | 8 | 8 | 8 | 15 |
| Hydrogen (ppm) | 92 | 90 | 90 | 130 | 130 | 150 | 90 | 170 | 80 |

[Example 9] Preparation of Catalyst Composition

A catalyst composition was prepared in the same manner as in Example 1, except that a 300 L reactor equipped with a stirrer and a separate filter dryer were used and each component was used as shown in Table 3 below.

TABLE 3

|  | First organometallic compound | | Second organometallic compound | | MAO (g) | Hexane (kg) | silica (kg) | Ethanox ® 330 (kg) |
|---|---|---|---|---|---|---|---|---|
|  | Type | (g) | Type | (g) | | | | |
| Example 9 | (n-PrCp)$_2$HfCl$_2$ | 274.7 | Compound A | 50 | 46 | 16.5 | 15 | 0.78 |

[Examples 1-9 to 1-12] Polyethylene Copolymerization and Physical Property Evaluation Thereof As shown in Table 4 below, polyethylene copolymerization was carried out in a continuous gas-phase fluidized bed reactor in which one slurry polymerization type prepolymerization reactor and one gas-phase reactor having a diameter of 60 cm were connected in series. The fluidized bed consists of polymer particle granules. Liquid 1-hexene and gaseous ethylene and hydrogen were mixed together in the pipe and injected into the reactor recycle gas line. As shown in Table 4 below, the flow rates of ethylene, hydrogen and 1-hexene or 1-butene were adjusted to maintain the desired fixed-composition and the flow rate of hydrogen was adjusted to maintain constant molar ratio of hydrogen to ethylene. The concentration of all gases was determined by on-line gas chromatography on the gas in the recirculating gas stream. Propylene was used as a diluent in the prepolymerization reactor and the gas-phase reactor. The copolymer of ethylene and alpha-olefin produced by the catalytic reaction was continuously discharged to operate so that the height of the fluidized bed of the gas phase reactor was kept constant. The temperature of the circulating gas was regulated using a heat exchanger to keep the operating temperature constant. The physical properties of the obtained polyolefin resin were measured and are shown in Table 6 below.

TABLE 4

| | | Example 1-9 | Example 1-10 | Example 1-11 | Example 1-12 |
|---|---|---|---|---|---|
| Catalyst | | Example 9 | Example 9 | Example 9 | Example 9 |
| Prepoly-merization reactor | Injection amount of catalyst (g/h) | 19.7 | 19.7 | 19.7 | 19.7 |
| | Reactor temperature (° C.) | 46 | 46 | 46 | 46 |
| | Reactor pressure (K/G) | 22.5 | 22.4 | 22.5 | 22.6 |
| | Injection amount of ethylene (kg/h) | 3.0 | 3.0 | 3.0 | 3.0 |
| | Injection amount of hydrogen (g/h) | 0.11 | 0.12 | 0.12 | 0.12 |
| | Injection amount of 1-hexane (kg/h) | 0.40 | 0.35 | 0.40 | — |
| | Injection amount of 1-butene (kg/h) | — | — | — | 0.20 |
| | Residence time (min) | 88 | 82 | 94 | 106 |
| Gas-phase reactor | Reactor temperature (° C.) | 75 | 75 | 75 | 75 |
| | Reactor pressure (K/G) | 22.1 | 22.0 | 22.1 | 22.2 |
| | Concentration of ethylene (mol %) | 11.6 | 10.5 | 12.8 | 11.2 |
| | Concentration of 1-hexane (mol %) | 0.177 | 0.206 | 0.112 | — |
| | Concentration of 1-butene (mol %) | — | — | — | 0.375 |
| | Concentration of hydrogen (ppm) | 76.4 | 56.6 | 53.8 | 34.7 |
| | Concentration ratio of hydrogen/ethylene (molppm/mol %) | 6.6 | 5.4 | 4.2 | 3.2 |
| | Concentration ratio of 1-hexane/ethylene (mol/mol) | 0.015 | 0.019 | 0.009 | — |

TABLE 4-continued

|  | Example 1-9 | Example 1-10 | Example 1-11 | Example 1-12 |
|---|---|---|---|---|
| Concentration ratio of 1-butene/ethylene (mol/mol) | — | — | — | 0.033 |
| Residence time (min) | 123 | 139 | 130 | 158 |
| Production rate(kg/h) | 58.9 | 52.1 | 56.1 | 46.2 |

[Comparative Example 1-2] Evaluation of Physical Properties of Ethylene/1-Hexene Copolymer Comparative Example 1-2 of Table 5 shows physical properties of ethylene/hexene copolymer (trade name: XP9200EN) commercially available from Daelim Industrial Co., Ltd., having a MIE of 1.0 g/10 min and a density of 0.918 g/cm$^3$, which is a polyolefin resin prepared by using a metallocene catalyst having a single active site.

[Comparative Example 1-3] Evaluation of Physical Properties of Ethylene/1-Butene Copolymer Comparative Example 1-3 of Table 6 shows physical properties of an ethylene/butene copolymer (trade name: XP3200UV) commercially available from Daelim Industrial Co., Ltd. having g a MIE of 1.2 g/10 min, and a density of 0.921 g/cm$^3$.

TABLE 5

|  | Example 1-1 | Example 1-2 | Example 1-3 | Example 1-4 | Example 1-5 |
|---|---|---|---|---|---|
| MIE | 0.9 | 0.7 | 0.8 | 0.8 | 1.1 |
| SR (F/E) | 30.4 | 30.7 | 32.7 | 36.5 | 29.7 |
| density(D) (kg/cm$^3$) | 914.5 | 915.4 | 919.1 | 923.0 | 918.0 |
| Mw (g/mol) | 124,882 | 133,096 | 131,374 | 135,811 | 118,989 |
| Mw/Mn | 4.34 | 4.18 | 4.25 | 6.71 | 5.57 |
| Mz/Mw | 2.90 | 2.73 | 2.91 | 4.09 | 4.01 |
| Sum wt % @TREF Temp(43~71' C.) (A) | 51.94 | 48.96 | 40.47 | 30.54 | 34.83 |
| −2.5*(D) + 2325 | 38.75 | 36.50 | 25.00 | 17.50 | 30.00 |
| Peak area* | 65.5 | 66.3 | 61.2 | 57.8 | 65.7 |
| Average SCB number/1000 C | 17.1 | 15.98 | 12.02 | 11.80 | 14.80 |
| −0.6(D) + 563 | 14.3 | 13.8 | 11.0 | 9.2 | 12.2 |
| COI | 8.23 | 8.72 | 8.49 | 7.39 | 5.81 |

|  | Example 1-6 | Example 1-7 | Example 1-8 | Comparative Example 1-1 | Comparative Example 1-2 |
|---|---|---|---|---|---|
| MIE | 1.0 | 1.1 | 0.8 | 0.8 | 1 |
| SR (F/E) | 30.2 | 27.3 | 29.7 | 19.64 | 16 |
| density(D) (kg/cm$^3$) | 919.3 | 919.9 | 920.5 | 918.6 | 918.0 |
| Mw (g/mol) | 135,228 | 117,417 | 129,007 | 120,798 | 123,871 |
| Mw/Mn | 4.44 | 4.82 | 3.95 | 3.13 | 2.46 |
| Mz/Mw | 3.91 | 3.49 | 3.23 | 2.42 | 1.92 |
| Sum wt % @TREF Temp(43~71' C.) (A) | 32.2 | 33.81 | 29.02 | 17.29 | 10.28 |
| −2.5*(D) + 2325 | 26.75 | 25.25 | 23.75 | 28.50 | 30.00 |
| Peak area* | 48.9 | 64.5 | 66.2 | 37.5 | 0 |
| Average SCB number/1000 C | 13.21 | 12.96 | 12.26 | 11.20 | 11.12 |
| −0.6(D) + 563 | 11.4 | 11.1 | 10.7 | 11.8 | 12.2 |
| COI | 4.63 | 7.57 | 4.8 | 3.75 | 0.15 |

*Peak area is peak area of deconvoluted TREF(%) (50~74° C. peak)

TABLE 6

|  | Example 1-9 | Example 1-10 | Example 1-11 | Comparative Example 1-2 | Example 1-12 | Comparative Example 1-3 |
|---|---|---|---|---|---|---|
| MIE | 0.83 | 0.47 | 0.75 | 1 | 1.09 | 1.2 |
| SR (F/E) | 26.04 | 27.38 | 25.03 | 16 | 21.8 | 15.5 |
| Density(D) (kg/cm$^3$) | 918.2 | 913.9 | 929.0 | 918.0 | 919.6 | 921.7 |
| Mw (g/mol) | 118,516 | 139,793 | 120,252 | 123,871 | 115,952 | 108,597 |
| Mw/Mn | 4.7 | 5.37 | 4.34 | 2.46 | 4.41 | 2.52 |
| Mz/Mw | 2.67 | 2.79 | 2.74 | 1.92 | 2.65 | 1.99 |

TABLE 6-continued

| | Example 1-9 | Example 1-10 | Example 1-11 | Comparative Example 1-2 | Example 1-12 | Comparative Example 1-3 |
|---|---|---|---|---|---|---|
| Sum wt % @TREF Temp(43~71' C.) (A) | 44.69 | 49.42 | 4.85 | 10.28 | 42.43 | 11.44 |
| −2.5*(D) + 2325 | 29.50 | 40.25 | 2.50 | 30.00 | 26.00 | 20.75 |
| Peak area of deconvoluted TREF (%) (50~74° C. peak) | 71.06 | 53.26 | 68.64 | 0 | 70.4 | 0 |
| Average SCB number/1000 C | 13.11 | 16.47 | 7.56 | 11.12 | 13.58 | 9.5 |
| −0.6(D) + 563 | 12.1 | 14.7 | 5.6 | 12.2 | 11.2 | 10.0 |
| COI | 6.2 | 8.83 | 4.9 | 0.15 | 6.2 | 0 |

Figure 2:
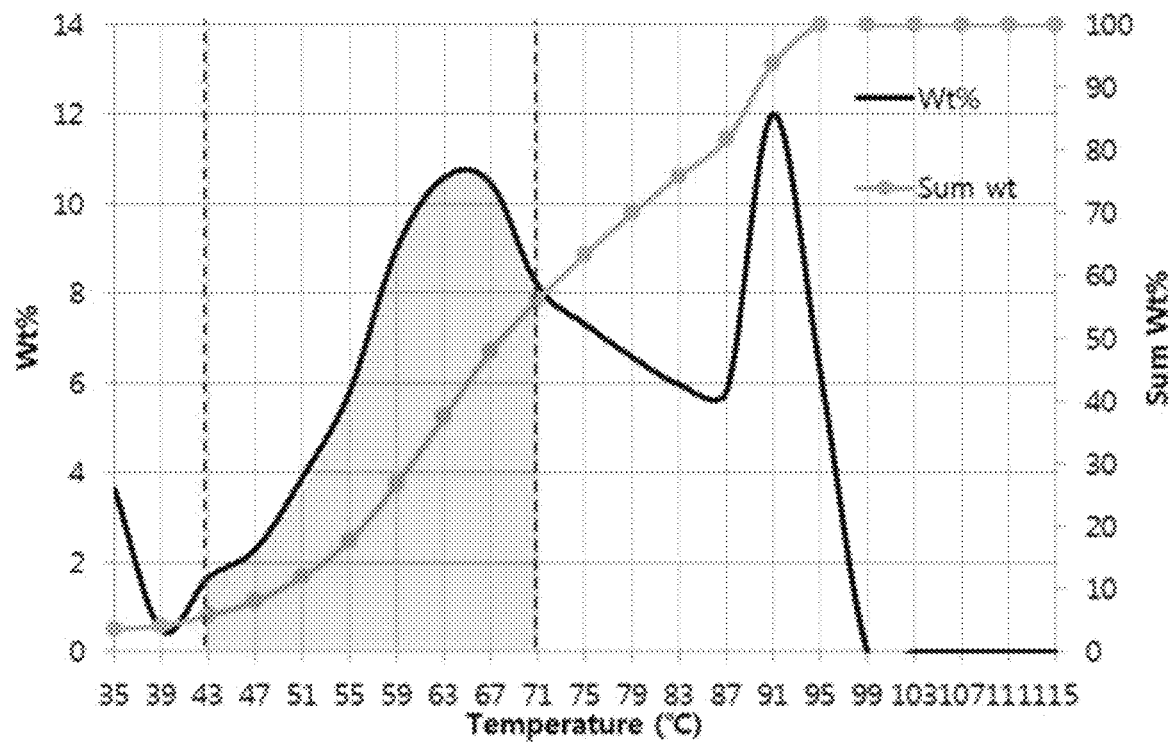
FIG. 2 is a graph showing TREF curve of multimodal distribution obtained by CFC analysis with respect to polyolefin resin according to Example 1-1 of the present invention, and the weight percentage of eluted components and the cumulative value of the weight percentage according to temperature.
Figure 3:
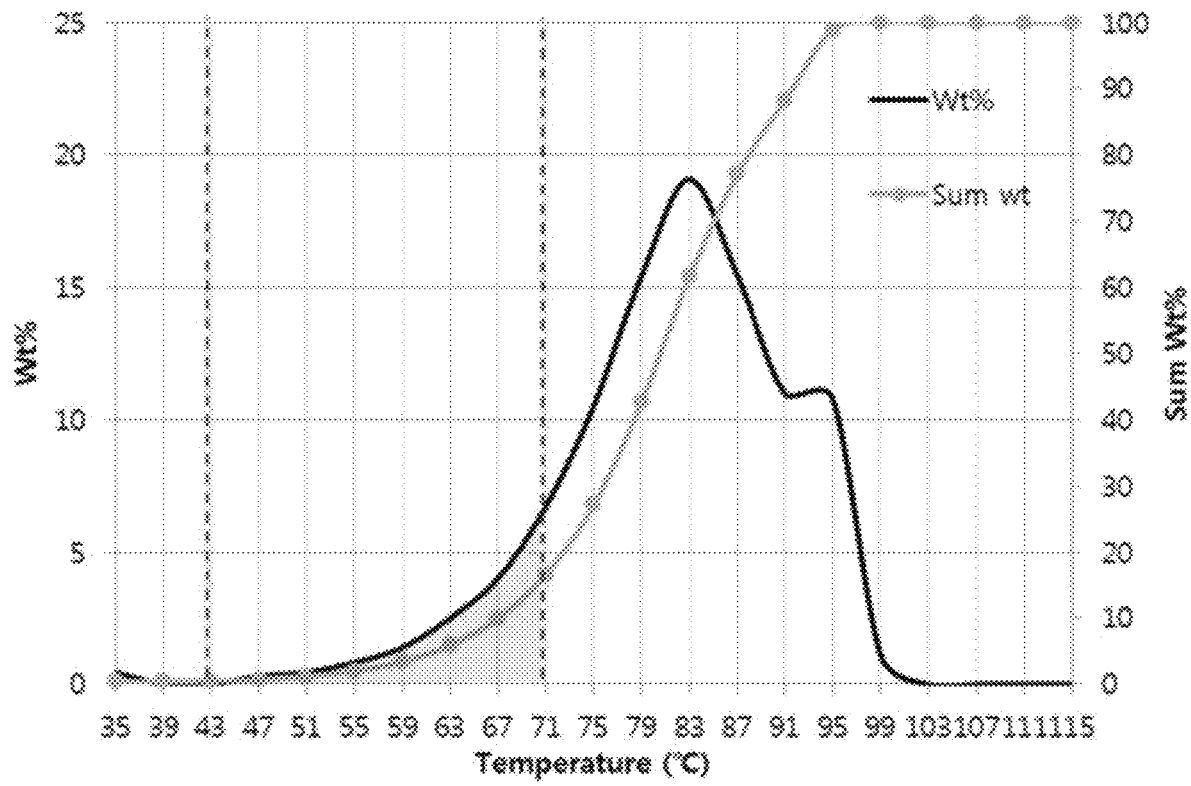
FIG. 3 is a graph showing TREF curve of multimodal distribution obtained by CFC analysis with respect to polyolefin resin according to Comparative Example 1-2 of the present invention, and the weight percentage of eluted components and the cumulative value of the weight percentage according to temperature.

With respect to the polyolefin resins of Examples 1-1 to 1-12 and Comparative Examples 1-1 to 1-3, in FIG. 1 there is shown a graph of the relationship between the sum (A) of the weight percentages (wt %) of and the density (D) (kg/m$^3$) of components which are eluted at a temperature range of 43 to 71° C., in Temperature Rising Elution Fractionation (TREF) of multimodal distribution obtained by CFC analysis. FIG. 2 and FIG. 3 each, with respect to the polyolefin resin of Example 1-1 and Comparative Example 1-2, respectively, shows, in TREF curve of multimodal distribution obtained by CFC analysis, the weight percentage of eluted components and the sum of the weight percentage according to temperature. In FIG. 2 and FIG. 3, the sum (A) of the weight percentages of the components eluting at 43 to 71° C. is indicated by dark area. As shown in FIGS. 1 to 3 and Table 5 and Table 6, the polyolefin resins obtained in Examples 1-1 to 1-12 are mostly high in the sum of the weight percentages (A) of the components eluted in the range of 43 to 71° C. as compared with the polyolefin resins obtained in Comparative Examples 1-1 to 1-3. Also, the polyolefin resins obtained in Examples 1-1 to 1-12 satisfy Equation 1.

Figure 4:
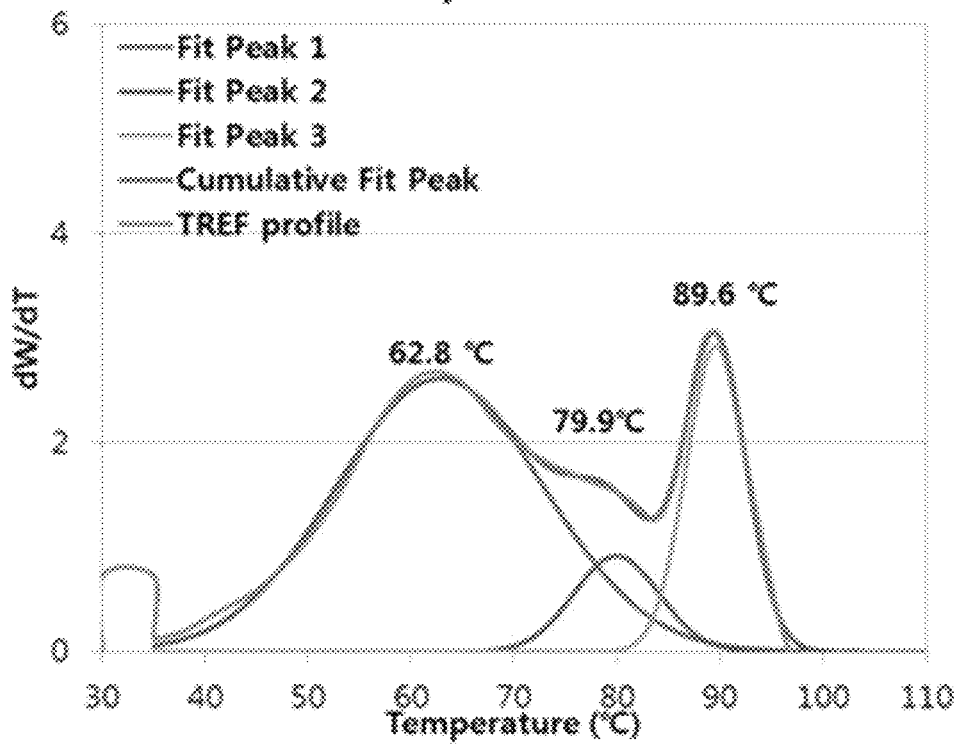
FIG. 4 is a graph showing various individual peaks for the polyolefin resin according to Example 1-1 of the present invention, the individual peaks being obtained by performing CFC analysis on the polyolefin resin of Example 1-1 to prepare a TREF curve of multimodal distribution and then deconvoluting the curve.

Further, in case where the polyolefin resins of Examples and Comparative Examples are subjected to TREF of multimodal distribution by a CFC analysis to obtain a curve of dW/dT (W: polymer weight ratio, T: temperature) and to do deconvolution on the curve, the polyolefin resins of Examples 1-1 to 1-12 each has a curve where the peak was located at 50 to 74° C. and the curve area of the corresponding peak to the total curve area is 40 to 75% (See: Table 5 and Table 6). FIG. 4 is a graph showing various individual peaks for the polyolefin resin according to Example 1-1 of the present invention, the individual peaks being obtained by performing CFC analysis on the polyolefin resin of Example 1-1 to prepare a TREF curve of multimodal distribution and then deconvoluting the curve.

Figure 5:
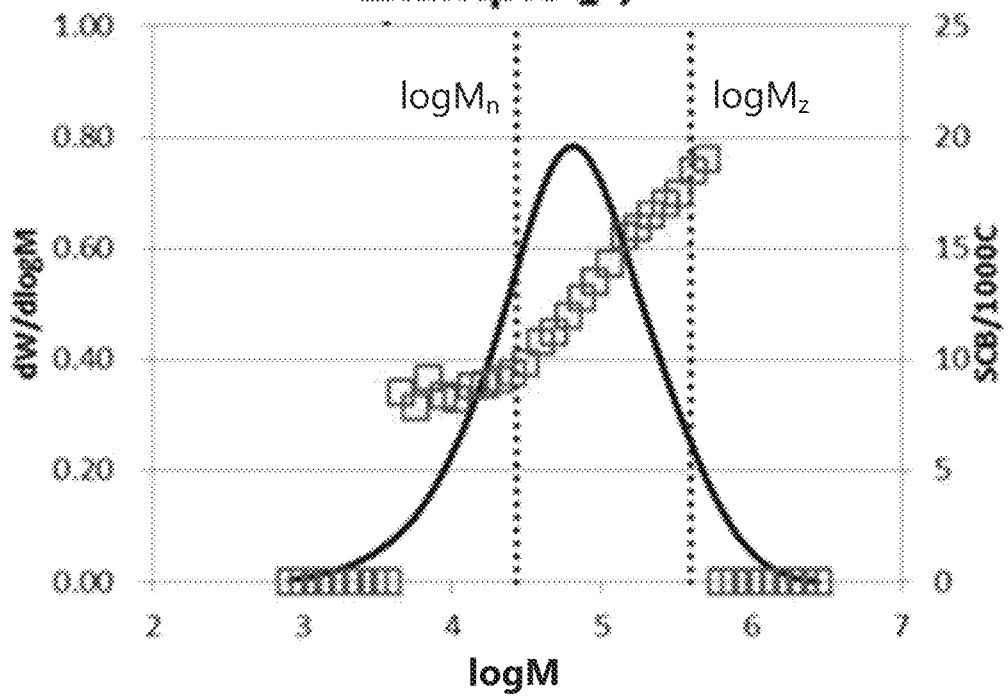
FIG. 5 is a graph showing the results of GPC-IR analysis for obtaining a COI value for the polyethylene resin of Example 1-7 of the present invention.
Figure 6:
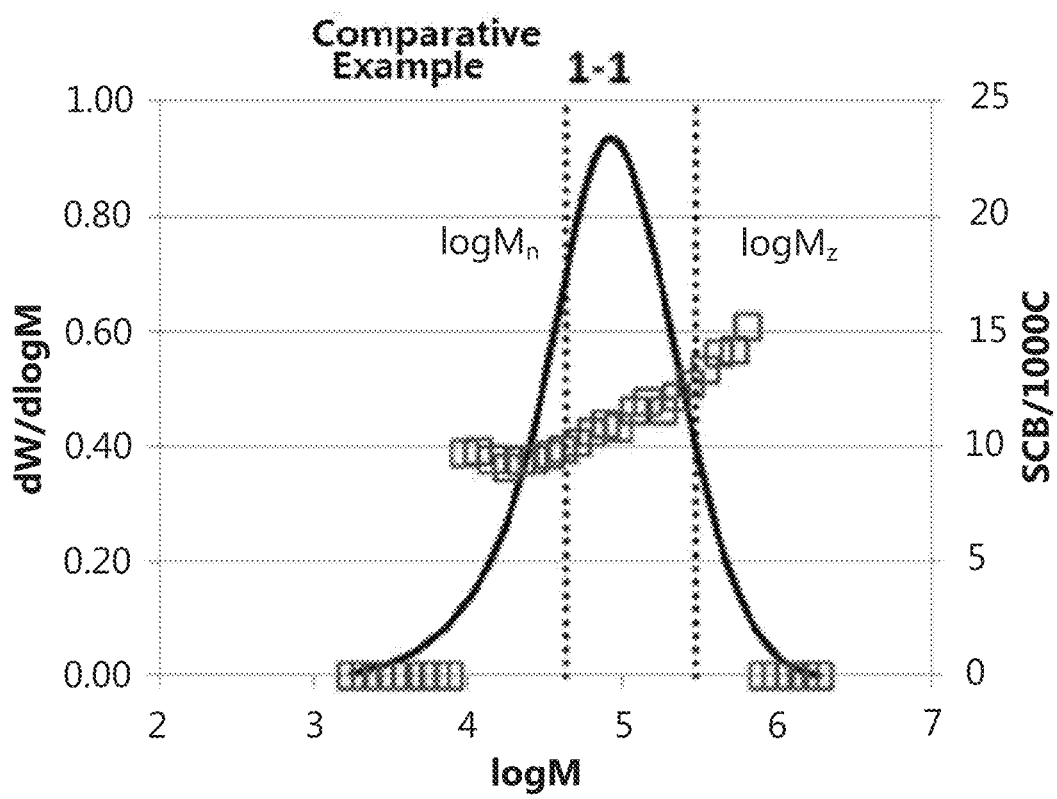
FIG. 6 is a graph showing the results of GPC-IR analysis for obtaining a COI value for the polyethylene resin of Comparative Example 1-1 of the present invention.
Figure 7:
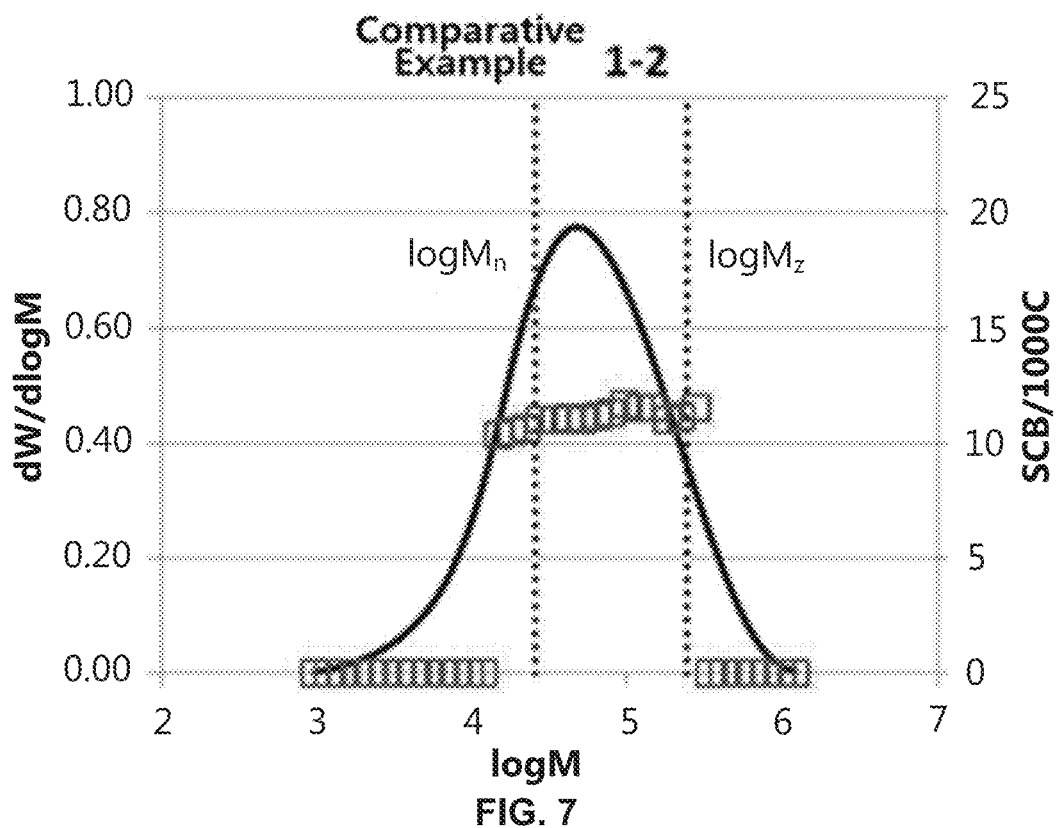
FIG. 7 is a graph showing the results of GPC-IR analysis for obtaining a COI value for the polyethylene resin of Comparative Example 1-2 of the present invention.

In addition, GPC-IR (Gel Permeation Chromatography-IR) analysis graphs for identifying the distribution of comonomers on the polyolefin resins of Example 1-7, Comparative Example 1-1 and Comparative Example 1-2, are shown in FIG. 5, FIG. 6 and FIG. 7, respectively. In FIGS. 5 to 7, M represents the molecular weight, w represents the weight ratio of the copolymer, a black solid line represents the GPC curve showing the molecular weight distribution, a red square represents the short chain branch (SCB) distribution in the molecular chain, which represents the number of comonomers contained per 1,000 carbon atoms in each molecular weight region represented by the GPC curve. As shown in FIGS. 5 to 7, the polyolefin resin of Comparative Example 1-2 has the same comonomer content in the low molecular weight portion and the high molecular weight portion, and the polyolefin resin of Examples 1-7 has a lower comonomer content in a low molecular weight portion and a higher comonomer content in high molecular weight portion, compared with the polyolefin resins of Comparative Examples 1-1 and 1-2. Further, as shown in Tables 5 to 6, the COI values of the polyolefin resins of Examples 1-1 to 1-12 (calculated by Formula 2) are in the range of 4.5 to 18, but the COI values of the polyolefin resins of Comparative Examples 1-1 and 1-3 are 4.5 or less, showing low BOCD characteristics.

Figure 8:
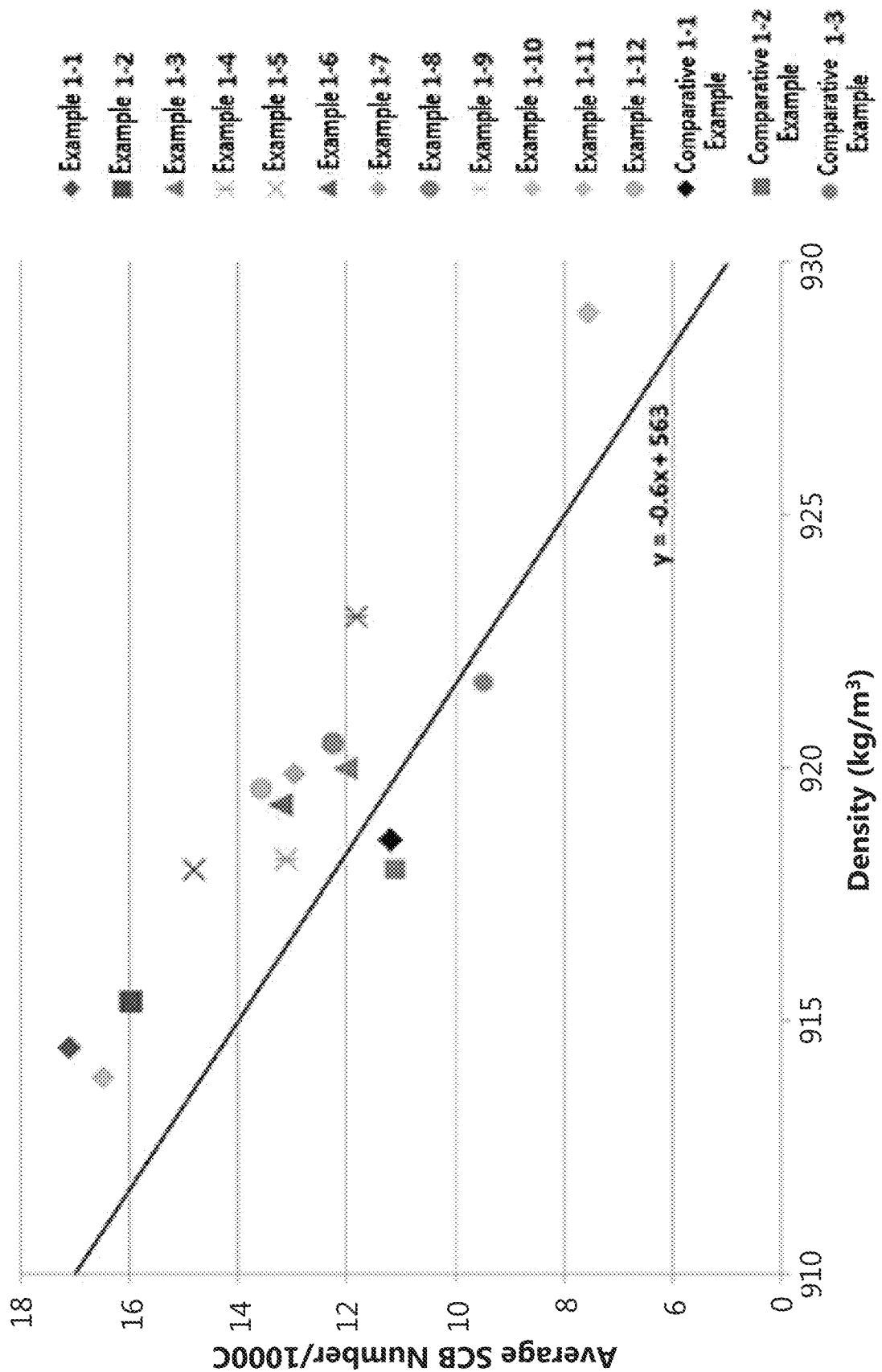
FIG. 8 is a graph showing the average number (B) of short chain branches per 1,000 carbon atoms according to the density (D) of the polyethylene resin obtained in Examples and Comparative Examples of the present invention.

Finally, the relation between the average number (B) of SCB (short chain branches) per 1,000 carbon atoms in the entire molecular weight range and the density (D) with respect to the polyethylene resins obtained in Examples 1-1 to 1-12 and Comparative Examples 1-1 to 1-3, are shown in FIG. 8. It can be seen that the polyolefin resins obtained in Examples 1-1 to 1-12 has a larger average number of short chain branches (SCB) per 1,000 carbon atoms in the entire molecular weight range than the polyolefin resins obtained in Comparative Examples 1-1 to 1-3, and the polyolefin resins of Examples 1-1 to 1-12 satisfy Equation 3.

[Examples 2-1 to 2-3, Comparative Examples 2-1 to 2-2] Film Preparation

To evaluate the blown film performance of the polyolefin copolymers obtained in Examples 1-1 to 1-3 and Comparative Examples 1-1 and 1-2, 500 ppmw of a primary antioxidant (product name: 1010, Songwon Industry), 1,000 ppmw of a secondary antioxidant (product name: 168, Songwon Industry) and 500 ppmw of PPA (Polymer Processing Auxiliaries) (product name: PA450, Hananotech Inc.) were added, which was fed to the biaxial compressor (Twin-Screw Extruder®, type: 814 30 2, model name: 911436), followed by melt-bending at temperature of 200° C. and screw rotation speed of 60 rpm and then pelletizing using a pelletizer. The pelletized polyolefin copolymers of Examples 1-1 to 1-3, Comparative Examples 1-1 and 1-2 were fed to a single screw extruder (Single-Screw Extruder®, type: 19 25/D, model name: 832005), followed by forming films having a thickness of 30 μm under a processing conditions of at temperature of 200° C., screw rotation speed of 60 rpm, die lip diameter of 25 mm, BUR (Blow-Up Ratio) of 3.2. The evaluation results of the properties of the produced films are shown in Table 7 below.

TABLE 7

|  | Example 2-1 | Example 2-2 | Example 2-3 | Comparative Example 2-1 | Comparative Example 2-2 |
|---|---|---|---|---|---|
| Ethylene copolymer | Example 1-1 | Example 1-2 | Example 1-3 | Comparative Example 1-1 | Comparative Example 1-2 |
| Melt pressure of resin, Bar | 130 | 140 | 130 | 145 | 159 |
| Dart falling impact strength (B), g | 935 | 1025 | 860 | 575 | 690 |

[Examples 2-9 to 2-12, Comparative Examples 2-2 and 2-3] Film Preparation and Evaluation Thereof To evaluate the blown film performance of the polyolefin copolymers obtained in Examples 1-9 to 1-12 and Comparative Example 1-3, 500 ppmw of a primary antioxidant (product name: 1010, Songwon Industry), 1,000 ppmw of a secondary antioxidant (product name: 168, Songwon Industry) and 500 ppmw of PPA (Polymer Processing Auxiliaries) (product name: PA450, Hananotech Inc.) were added, which was fed to the biaxial compressor (Twin-Screw Extruder®, model name: TEK30, Manufacturer: SM Platek, Screw diameter 31.6, L/D 40), followed by melt-bending at temperature of 180° C. and screw rotation speed of 220 rpm and then pelletizing using a pelletizer.

The pelletized polyolefin copolymers of Examples 1-9 to 1-12, Comparative Examples 1-2 and 1-3 were fed to a blown film extruder (model name: LLD Blown Film M/C 40, Manufacturer: Duk young Tech), followed by forming single films having thickness mentioned in following Table 8 under a processing conditions of at temperature of 180° C., screw diameter of 40 mm, screw rotation speed of 90 rpm, BUR (Blow-Up Ratio) of 2.5/39.3 cm, die lip diameter of 100 mm. On the other hand, 70 wt % of a pelletized polyolefin copolymer of Examples 1-9 to 1-10 and 1-12, Comparative Examples 1-2 and 1-3, and 30 wt % of a low density polyethylene product (HANWHA LDPE 5321) produced by Hanwha Chemical Co., were mixed and fed to a blown film extruder, to prepare a blend film under the same processing conditions as the single film production. The properties of the prepared single films and blend films were evaluated, and the results thereof are shown in Table 8 below.

In table 8, the mark "(A)" means that the dart falling impact strength is measured with Test Method A.

Since the polyethylene resin of Comparative Example 1-2 is a resin prepared using a metallocene catalyst having a single active site, the resin has excellent physical properties, but has a narrow molecular weight distribution and a poor processability. In order to prepare a polyethylene resin having excellent processability and physical properties in a single reactor, a catalyst composition comprising at least one first organometallic compound and at least one second organometallic compound is used. Although the polyolefin resin of Comparative Example 1-1 was prepared using two different kinds of organometallic compounds, as shown in Table 5, the polyolefin resins obtained in Examples 1-1 to 1-8 have relatively large Mw/Mn and Mz/Mw and thus are excellent in processability. The polyolefin resins obtained in Examples 1-1 to 1-8 satisfy Formula 1, and the tie molecular between the molecular chains thereof is sufficient to have excellent the dart falling impact strength as shown in Table 7. In addition, when the temperature Rising Elution Fractionation (TREF) curve of multimodal distribution is deconvoluted by CFC analysis, compared with Comparative Example 1-1 in which the peak area at 50 to 74° C. is not more than 40% of the total area, the polyolefin resin of the Examples contains an appropriate level of polymer component having many branches derived from comonomer, satisfies Equation 3 and the COI value calculated from Equation 2 thereof is in the range of 4.5 to 18, so that the resins of the Examples satisfy both the dart falling impact strength and the processability simultaneously.

Therefore, when a compound A having a substituent that exhibits a steric hindrance effect is used as the second organometallic compound (Examples 1-1 to 1-3), compared

TABLE 8

|  |  | Example 2-9 | Example 2-10 | Example 2-11 | Comparative Example 2-2 | Example 2-12 | Comparative Example 2-3 |
|---|---|---|---|---|---|---|---|
| Ethylene copolymer |  | Example 1-9 | Example 1-10 | Example 1-11 | Comparative Example 1-2 | Example 1-12 | Comparative Example 1-3 |
| Kind of copolymer |  | 1-hexene | 1-hexene | 1-hexene | 1-hexene | 1-butene | 1-butene |
| Film thickness (μm) |  | 30 | 30 | 50 | 30 | 30 | 30 |
| Single film evaluation | Melt pressure of resin, Bar | 288 | 350 | 268 | 317 | 302 | 313 |
|  | dart falling impact strength (B), g | 1,400 | 1,310 | 328 | 665 | 223 | 123 |
|  | haze, % | 13.1 | 25.4 | 13.4 | 15 | 11.5 | 19.1 |
| Blend film evaluation | Melt pressure of resin, Bar | 245 | 288 |  | 278 | 257 | 272 |
|  | Dart falling impact strength (A), g | 398 | 368 |  | 228 | 163 | 108 |
|  | Haze % | 4.1 | 3.6 |  | 3.6 | 4.3 | 4.8 | with the case of using the compound G having a substituent having a low steric hindrance effect (Comparative Example 1-1), a polyolefin having excellent processability and dart falling impact strength can be produced. It is understood that even when the same first organometallic compound is used, the steric hindrance of the substituent of the second organometallic compound significantly affects the impact properties of the polyolefin resin. That is, the second organometallic compound provides, through steric hindrance, a molecular weight-comonomer composition distribution in the form of a lower molecular weight and a lower comonomer content than the first organometallic compound. As a result, the polyolefin resin has a high melt flow rate ratio, and tie-molecules between the molecular chains is increased as the content of the polymer component having a long branch is increased. A polyolefin resin excellent in both physical properties and processability can be produced.

Further, under the condition that the melt flow index (MIE) is equivalent, the polyolefin resin of the present invention is superior to the conventional mLLDPE in film transparency.

The invention claimed is:

1. A method for producing a polyolefin comprising polymerizing ethylene and an alpha-olefin comonomer in the presence of a polyolefin polymerization catalyst composition,
   wherein the catalyst composition comprises:
   at least one first organometallic compound represented by following Formula 1;
   at least one second organometallic compound represented by following Formula 2; and
   aluminoxane, $(L1)(L2)(X1)(X2)M1$      [Formula 1]

in Formula 1, M1 is hafnium (Hf); (L1) and (L2) each is a cyclopentadienyl group having an alkyl substituent of 3 to 4 carbon atoms; (X1) and (X2) each is independently F, Cl, Br, I or a hydrocarbon group of 1 to 10 carbon atoms;

[Formula 2]

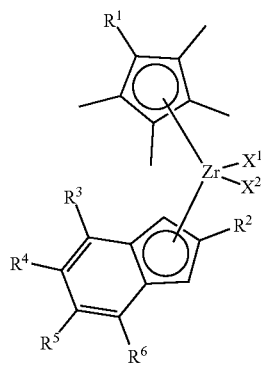

in Formula 2, $R^1$ is a methyl group and $R^2$ to $R^6$ each is independently hydrogen or an alkyl group laving 1 to 10 carbon atoms; $X^1$ and $X^2$ each is independently F, Cl, Br, I or a hydrocarbon group of 1 to 10 carbon atoms,
   wherein the polyolefin satisfies following properties (i) to (iv) and (vi), (i) melt flow index (measured according to ASTM D1238), measured at 190° C., under a load of 2.16 kg: 0.1 to 1.5 g/10 min;
   (ii) density: 910 to 930 kg/m$^3$;
   (iii) ratio (Mw/Mn) of weight average molecular weight (Mw) to number average molecular weight (Mn), as measured by gel permeation chromatography: 3.2 to 6.0;
   (iv) ratio (Mz/Mw) of Z-average molecular weight (Mz) to weight-average molecular weight (Mw), as measured by gel permeation chromatography: 2.4 to 3.4;
   (vi) when a TREF (temperature rising elution fractionation) curve of multimodal distribution is deconvoluted, an area of the TREF curve having a peak at 50 to 74° C. is 40 to 75% of a total area of the TREF curve of multimodal distribution.

2. The method for producing a polyolefin as claimed in claim 1, wherein the alpha-olefin comonomer is at least one selected from the group consisting of propylene, 1-butene, 1-pentene, 4-methyl-pentene, 1-hexene, 1-heptene, 1-octene, 1-decene, 1-undecene, 1-dodecene, 1-tetradecene, 1-hexadecene, 1-octadecene, 1-eicosene and mixtures thereof, and an amount of alpha-olefin comonomers is from 1 to 4 mol %, with respect to the ethylene and alpha-olefin comonomer.

3. The method for producing a polyolefin as claimed in claim 1, wherein when deconvolution of the TREF curve of multimodal distribution is performed, a number of peaks is 2 to 5.

4. The method for producing a polyolefin as claimed in claim 1, wherein the polyolefin further satisfies following property (v),
   (v) in the TREF curve of multimodal distribution, a weight percentage (wt %) sum (A) and density (D, unit: kg/m$^3$) of components eluted at a temperature range of 43 to 71° C. (A) satisfy following Equation 1

$A > -2.5*(D)+2325$      [Equation 1].

5. The method for producing a polyolefin as claimed in claim 1, the polyolefin resin further satisfies following properties (vii) and (viii),
   (vii) COI (Comonomer Orthogonal Index) value calculated by the following Equation 2: 4.5 to 18

$$\text{comonomer orthogonal index } (COI) = \frac{SCB \text{ number in } Mz - SCB \text{ number in } Mn}{\log Mz - \log Mn}$$      [Equation 2]

in Equation 2, Mz and Mn are Z-average molecular weight and number average molecular weight of the polyolefin, measured by gel permeation chromatography equipped with an IR detector, respectively, and a number of SCB (Short Chain Branch)s in Mz and a number of SCBs in Mn represent a number of average side branches derived from comonomers per 1000 carbons in Z-average molecular weight (Mz) and number-average molecular weight (Mn), respectively,
   (viii) an average SCBs number per 1,000 carbons (B), and density (D, unit: kg/m$^3$) over an entire molecular weight range satisfy following Equation 3

$B > -0.6*(D)+563$      [Equation 3].

* * * * *